(12) United States Patent
Yasuda et al.

(10) Patent No.: US 6,384,887 B1
(45) Date of Patent: *May 7, 2002

(54) LIQUID CRYSTAL DEVICES COMPRISING A MULTITUDE OF DOMAINS HAVING DIFFERENT THRESHOLD VOLTAGES FOR SWITCHING LIQUID CRYSTALS

(75) Inventors: Akio Yasuda; Keiichi Nito, both of Tokyo; Eriko Matsui; Hidehiko Takanashi, both of Kanagawa; Ying-Bao Yang, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/419,753

(22) Filed: Oct. 18, 1999

Related U.S. Application Data

(62) Division of application No. 08/900,933, filed on Jul. 25, 1997, now Pat. No. 6,040,884, which is a continuation of application No. 08/139,908, filed on Oct. 22, 1993, now Pat. No. 5,654,784.

(30) Foreign Application Priority Data

Oct. 24, 1992 (JP) .............................................. 4-309238
Oct. 24, 1992 (JP) .............................................. 4-309239
Nov. 26, 1992 (JP) .............................................. 4-341719

(51) Int. Cl.$^7$ ...................... G02F 1/1337; G02F 1/1333
(52) U.S. Cl. ........................ 349/129; 394/123; 394/122
(58) Field of Search .......................... 349/56, 125, 129, 349/172, 122

(56) References Cited

U.S. PATENT DOCUMENTS 5,539,547 A * 7/1996 Ishii et al. ................ 349/86

* cited by examiner

Primary Examiner—Toan Ton
(74) Attorney, Agent, or Firm—Sonnenschein, Nath & Rosenthal

(57) ABSTRACT

A liquid crystal device comprises a pair of substrates and a liquid crystal provided between the paired substrates wherein domains whose threshold voltages are different from one another are finely distributed throughout the liquid crystal. In particular, the respective substrates each has a transparent electrode and an alignment film formed thereon in this order and the substrates are assembled to establish a given space therebetween, and a ferroelectric liquid crystal being injected into the given space wherein domains are finely distributed as set out above, thereby providing a a liquid crystal display device. The fine distribution is such that when a transmittance through inverted domains is 25%, the number of domains (microdomains) having a size of larger than 2 $\mu m\phi$ in a field of 1 mm$^2$ is not smaller than 300, preferably not smaller than 600, and the width of the threshold voltage within the domains is not smaller than 2 volts within a transmittance range of from 10 to 90%. The liquid crystal device, particularly the display device, keeps a high contrast and can easily, reliably realize an analog gray-side display at low costs.

6 Claims, 31 Drawing Sheets

THRESHOLD VOLTAGE CHARACTERISTIC OF FERROELECTRIC LIQUID CRYSTAL

F I G. 2A
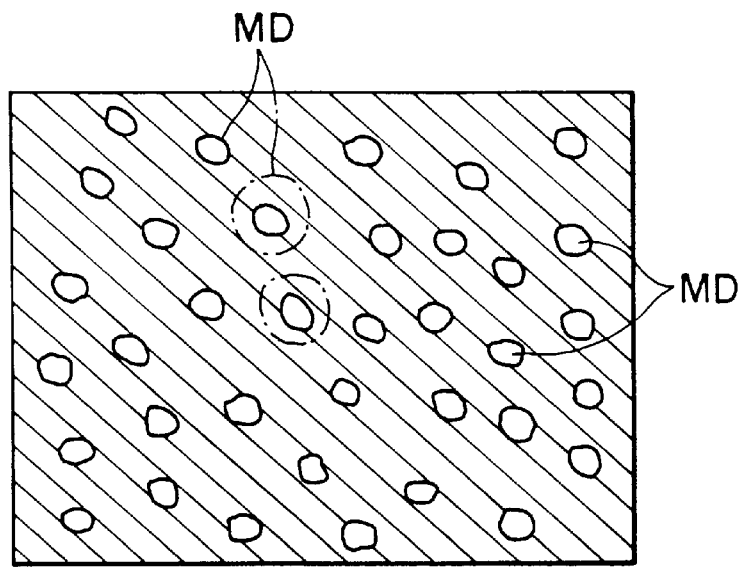
F I G. 2B
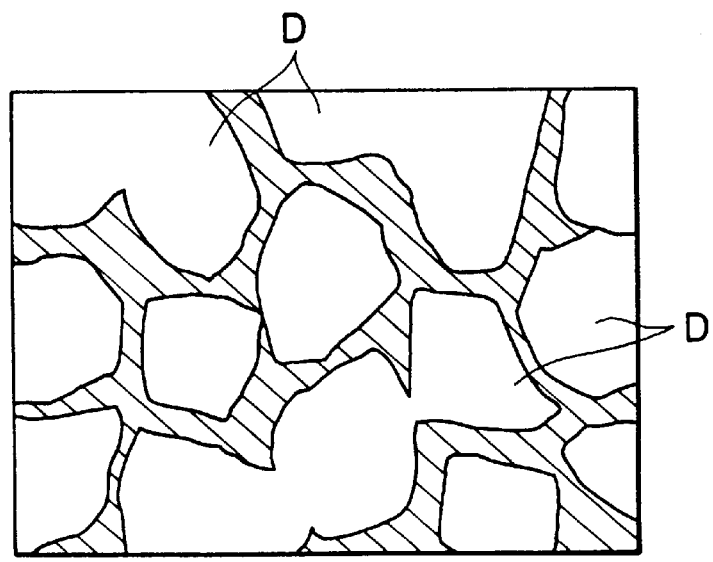

$d1 + d2 = dgap$ $$Eeff = \frac{\varepsilon_2}{\varepsilon_1 d_2 + \varepsilon_2 d_1} \times Vgap \quad\quad\quad (1)$$

$\varepsilon_1$ : DIELECTRIC CONSTANT OF LIQUID CRYSTALS
$\varepsilon_2$ : DIELECTRIC CONSTANT OF FINE PARTICLES ADDED F I G. 12
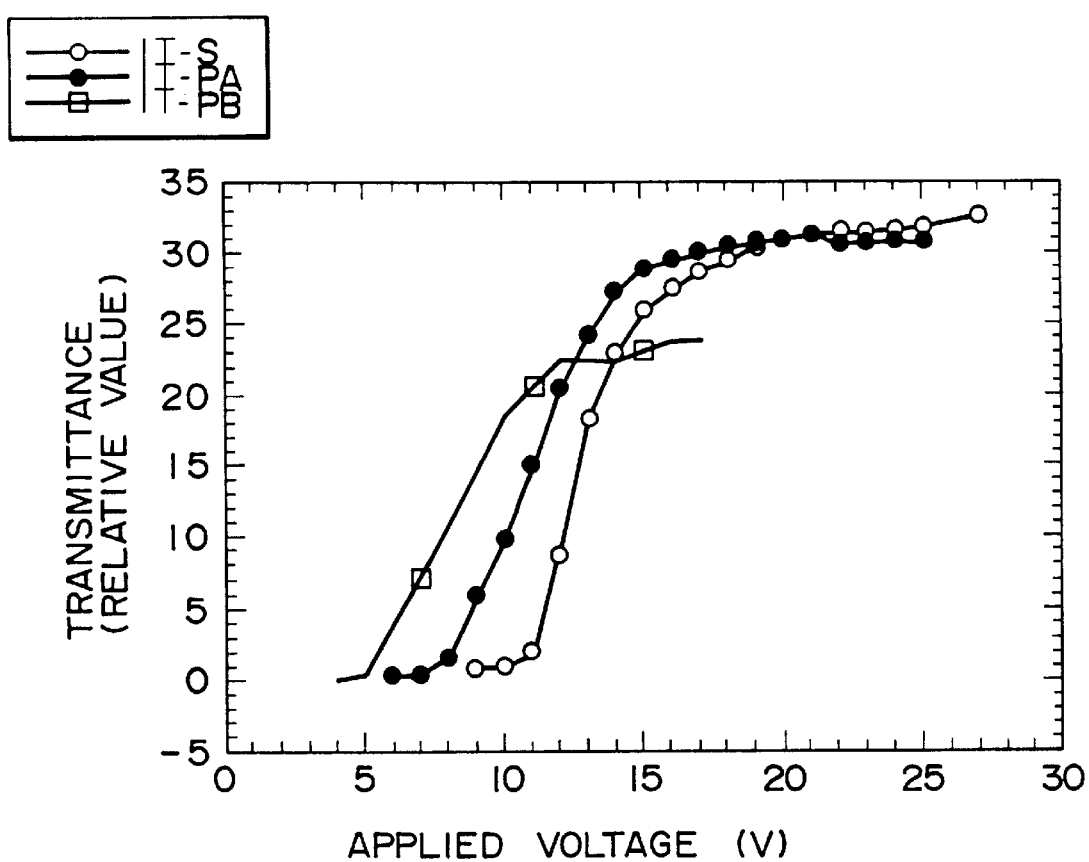

SETUP FOR X-RAY DIFFRACTION MEASUREMENT
(AS VIEWED FROM RIGHT ABOVE)

X-RAY DIFFRACTION PATTERN AT A WIDTH OF A THRESHOLD VOLTAGE OF 1V

X-RAY DIFFRACTION PATTERN AT A WIDTH OF A THRESHOLD VOLTAGE OF 10V

WIDTH OF THE THRESHOLD VOLTAGE = 1V

WIDTH OF THE THRESHOLD VOLTAGE = 10V

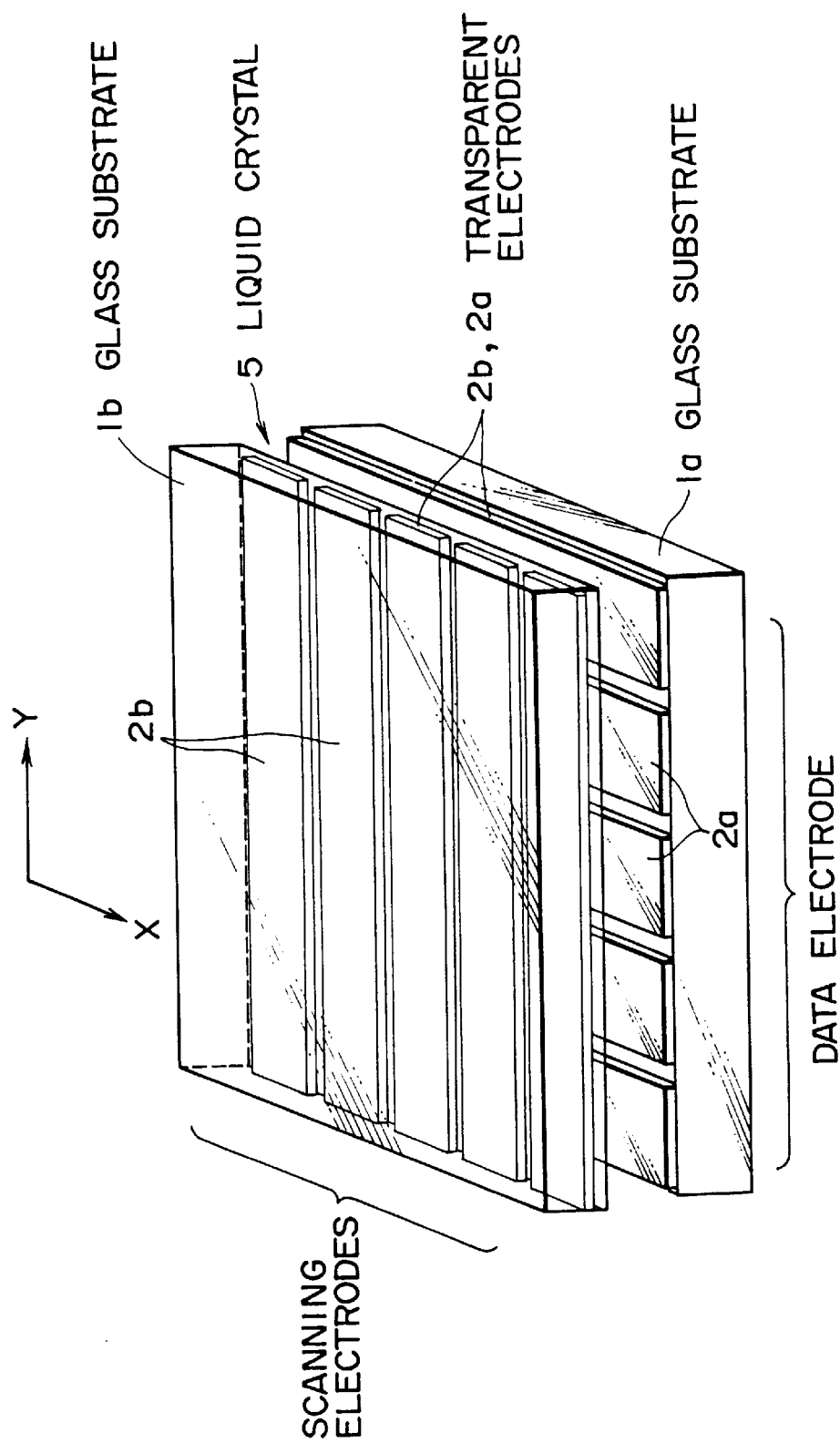

SCANNING WAVEFORM

CLOCK = 40

DATA WAVEFORM

CLOCK = 40

FIG. 28

SPACER (WHITE BRIGHT SPOT) : CONTRAST LOWERED

AT THE PORTION SURROUNDED BY A DOTTED CIRCLE, SWITCHING OCCURS IN THE ABSENCE OF ANY SPACER.

SPACER (WHITE BRIGHT SPOT) : CONTRAST LOWERED

MODEL OF FERROELECTRIC LIQUID CRYSTAL

THRESHOLD CHARACTERISTIC OF
FERROELECTRIC LIQUID CRYSTAL

LIQUID CRYSTAL DEVICES COMPRISING A MULTITUDE OF DOMAINS HAVING DIFFERENT THRESHOLD VOLTAGES FOR SWITCHING LIQUID CRYSTALS

This application is a divisional of application Ser. No. 08/900,933, filed on Jul. 25, 1997, now U.S. Pat. No. 6,040,884, which is a continuation of application Ser. No. 08/139,908, filed on Oct. 22, 1993, now U.S. Pat. No. 5,654,784.

BACKGROUND OF THE INVENTION

1. Field of the Invention

This invention relates to a liquid crystal device having a liquid crystal provided between a pair of substrates and more particularly, to an improved liquid crystal device wherein a pair of substrates, each having a transparent electrode and an alignment film thereon in this order, are provided at a given space therebetween so that the alignment films of the respective substrates are in face-to-face relation, and a ferroelectric liquid crystal provided in the space between the paired substrates.

2. Description of the Prior Art

Studies and developments of ferroelectric liquid crystals (FLC) for application as display devices have been progressively made for the past decade. The FLC display devices have the following three characteristic features (1) to (3).

(1) High speed response (higher by 1000 times than that of known nematic display devices).

(2) Reduced dependence on an angle of view.

(3) Capability of memorizing images.

As a display technique of such ferroelectric liquid crystals, there has been proposed by Clark et al (U.S. Pat. No. 4,367,924) a surface stabilized ferroelectric liquid crystal display device wherein the cell gap between the display panels is so controlled as to be not larger than 2 μm and liquid crystal molecules are aligned by use of a molecule alignment regulating force established at the interface between the panels, thereby attaining bistable energy states. Based on the high speed response in the order of microseconds and the memorizing effect of images, this device has been intensively studied and developed.

The bistable mode ferroelectric liquid crystal display has a number of features. More particularly, since the display device has the memory properties, flickering which is one of the problems of a cathode ray tube (CRT) can be avoided. Moreover, the display device can be driven at 1000 or more scanning lines by a simple X-Y matrix drive (without driving with a thin film transistor (TFT)). In addition, with regard to the problem of currently employed nematic liquid crystal displays that the viewing angle is narrow, the ferroelectric liquid crystal display has a uniform alignment of molecules and has the gap between the panels which is not greater than the half of that of the nematic liquid crystal panels, so that a wide viewing angle can be attained.

Such a ferroelectric liquid crystal display device has a structure as, for example, schematically shown in FIG. 36. More particularly, a transparent substrate $1a$ such as glass is provided, on which a transparent electrode layer $2a$ such as ITO (indium tin oxide) and a liquid crystal alignment film $3a$ such as, for example, a SiO oblique vacuum deposition layer are formed to provide a builtup structure A. Likewise, a substrate $1b$ is provided on which a transparent electrode layer $2b$ and, for example, a SiO oblique vacuum deposition layer $3b$ are formed to provide a builtup structure B. These structures are so arranged that the SiO oblique vacuum deposition layers $3a$, $3b$, which are, respectively, used as a liquid crystal alignment film, are facing each other. Spacers 4 are intervened between the structures to provide a liquid crystal cell. A ferroelectric liquid crystal 5 is injected into a given cell gap to complete a liquid crystal display device.

Although the FLC display device has such good features as set out hereinabove, there is the problem that an analog gray-scale display is difficult. More particularly, existing bistable mode ferroelectric liquid crystal display devices are stabilized only in two modes. Thus, it has been accepted that the devices are not suitable for the analog gray-scale display such as of video signals.

With conventional ferroelectric liquid crystal devices (e.g. surface stabilized ferroelectric liquid crystal devices), the alignment direction of the molecule M is switched between state 1 and state 2, as shown in FIG. 37, relative to an externally applied electric field E. This change in the alignment of the molecule is developed as a change in transmittance when the liquid crystal device is placed between the polarization plates which are intersected at right angles. As shown in FIG. 38, the transmittance relative to the applied electric field is abruptly changed from 0% to 100% at a threshold voltage $V_{th}$. The range or width of the threshold voltage within which the transmittance undergoes the abrupt change is generally not larger than 1 V. Accordingly, with known liquid crystal devices, it becomes difficult to have a stable threshold voltage width in the transmittance/applied voltage curve. Thus, the analog gray-scale display based on the control of the voltage will be difficult or impossible.

To cope with the difficulty, there has been proposed a a gray-scale method wherein sub-pixels are provided to appropriately control an area of pixels (pixel area gradation method), or a method wherein using high speed switching of a ferroelectric liquid crystal, the switching is repeated during one field (time integration gradation method). However, these methods have not been satisfactory with respect to the gray-scale display yet.

More specifically, with the area gradation method, an increasing number of gradations results in the increase in number of necessary sub-pixels. From the aspect of fabricating and driving display devices, it will be apparent that cost performance is not good. On the other hand, the time integration gradation method is disadvantageous in its practical utility when used alone or in combination with the area gradation method. In order to carry out an analog gray-scale display for every pixel, there has been proposed a method wherein the electric field intensity is locally graded by changing the distance between the facing electrodes within one pixel or by changing the thickness of a dielectric layer formed between the facing electrodes. Alternatively, a method has been proposed in which the voltage is graded by changing materials for the facing electrodes.

However, for the fabrication of liquid crystal display devices having analog gray-scale or gradation display characteristics at a practical level, these methods have the problem that the fabrication steps become complicated, the fabrication conditions have to be very severely controlled, and the fabrication costs become high.

On the other hand, as set forth in Japanese Laid-open Patent Application No. 3-276126, there has been proposed an FLC display device wherein the alignment film has fine alumina particles with a size of 0.3 to 2 μm sprayed or distributed over the surface thereof. The area of the inversion of the ferroelectric liquid crystal domain at portions where the fine particles are present and at portions where no fine particles are present is controlled by means of an applied voltage to make an intended gray-scale display. However, with this known device, the fine particles are too large in size and the amount of the particles being sprayed is not clearly set forth. In practice, it would be almost impossible to realize an intended analog gray-scale display. More particularly, mere spraying of the fine particles with a size of 0.3 to 2 $\mu$m in a cell gap of 2 $\mu$m makes it very difficult to minutely change the area of the inversion of the liquid crystal within one pixel. In addition, the ferroelectric liquid crystal display device makes a display in birefringence mode of the liquid crystal, so that it will be very difficult to control the cell gap, resulting in color shading. This is considered to be the same as with existing STN (super twisted nematic) display device wherein the variation of the cell gap should be not larger than 500 angstroms.

SUMMARY OF THE INVENTION

It is accordingly an object of the invention to provide a ferroelectric liquid crystal device which overcomes the drawbacks of the prior art devices.

It is another object of the invention to provide a ferroelectric liquid crystal device which can easily, reliably realize an analog gray-scale or gradation display at low costs while keeping a high contrast.

It is a further object of the invention to provide a ferroelectric liquid crystal device wherein microdomains with different threshold voltages are developed within one pixel, so that the transmittances of the microdomains are relatively gently changed depending on the voltage being applied.

It is a still further object of the invention to provide a ferroelectric liquid crystal device wherein when liquid crystal molecules are bistable, flicker-free still images with a memory function can be formed, thereby ensuring an analog continuous gradation or gray-scale display at high contrast.

The above objects can be achieved, according to the invention, by a liquid crystal device which comprises a pair of substrates, and a liquid crystal provided between the paired substrates, domains whose threshold voltages for switching the liquid crystal are different from one another being finely distributed in the liquid crystal.

BRIEF DESCRIPTION OF THE DRAWINGS

FIGS. 2A and 2B are, respectively, a schematic view illustrating the variation of transmittance at the time of switching of the liquid crystal display device and a schematic view similar to FIG. 2A but illustrating a case involving no gradation;

FIG. 12 is a graph showing the relation between the transmittance and the applied voltage of liquid crystal display devices using different types of fine particles;

FIG. 18 is a schematic perspective view of a liquid crystal display device;

FIG. 28 is a plan view of pixels used to measure a pretilt angle of liquid crystal molecules;

PREFERRED EMBODIMENTS OF THE INVENTION

The liquid crystal device of the invention may be so arranged that the device comprises a pair of substrates, each substrate having a transparent electrode and an alignment film formed thereon in this order, the substrates being arranged at a given space therebetween so that the alignment films of the respective substrates are facing each other, and a ferroelectric liquid crystal injected into the given space. The term "fine domains whose threshold voltages for switching the liquid crystal are different from one another are finely distributed" means that when the transmittance through inverted domains (e.g. black domains in white and vice versa) is 25%, the number of domains having a size of larger than 2 $\mu m\phi$ (microdomains) in a field of 1 $mm^2$ is not smaller than 300, preferably not smaller than 600 and that the width of the threshold voltage within the domains is not smaller than 2 volts within a transmittance range of from 10 to 90%.

Figure 1:
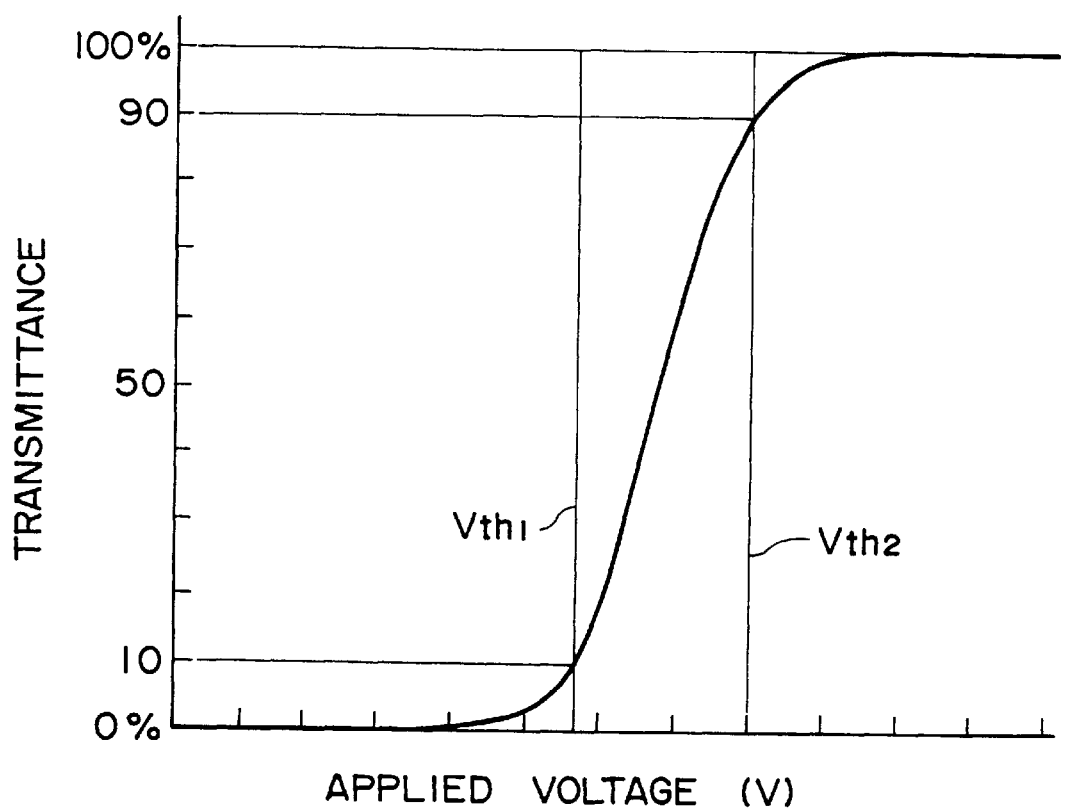
FIG. 1 is a graph showing the relation between the transmittance and the applied voltage, which shows a threshold voltage characteristic, of a liquid crystal display device according to the invention.
Figure 38:
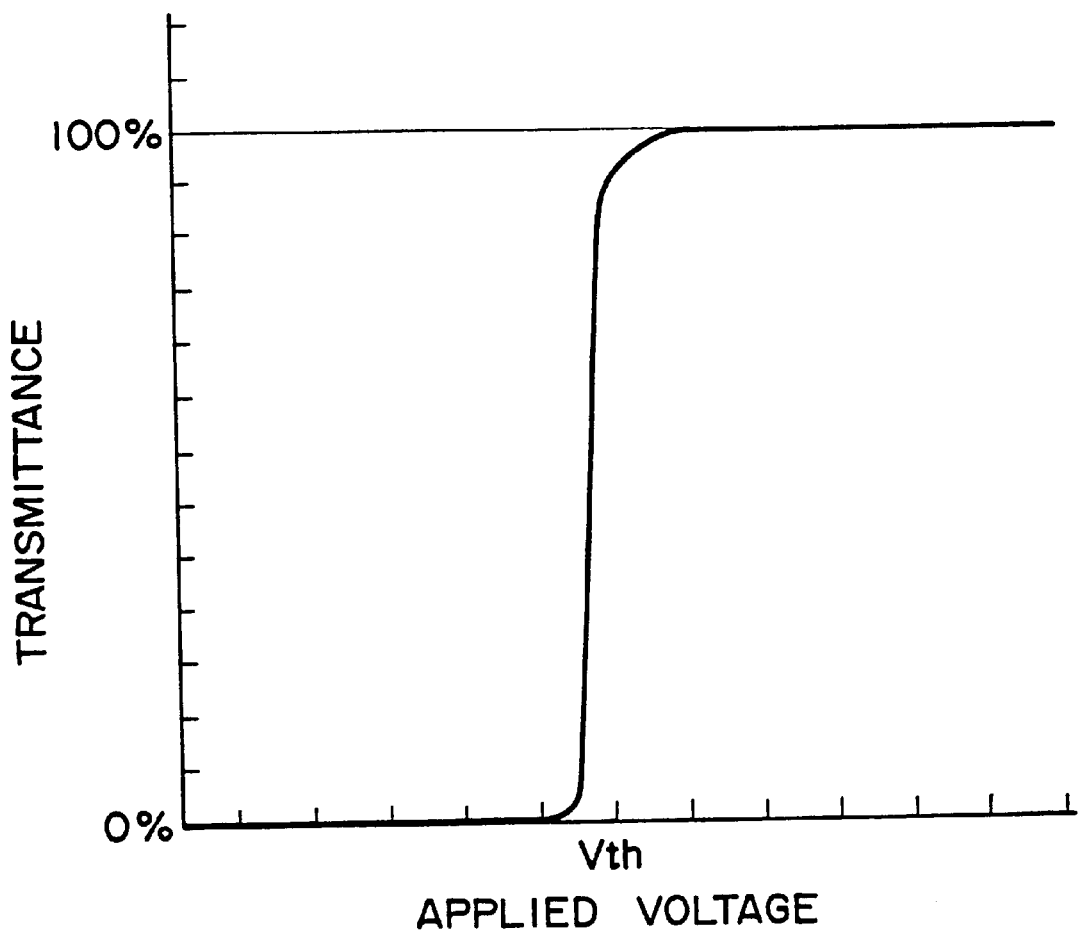
FIG. 38 is a graph showing the relation between the transmittance and the applied voltage of a prior art liquid crystal display device.

As is particularly shown in FIG. 1, the liquid crystal device of the invention undergoes a relatively gentle change of transmittance in relation to the variation of an applied voltage. This is contrary to the prior art device where the transmittance is abruptly changed as shown in FIG. 38. As stated hereinabove, this is because fine domains or microdomains whose threshold voltages ($V_{th}$) are different from one another appear within one pixel and thus, the transmittance of the microdomains are changed depending on the applied voltage. When the liquid crystal molecules are bistable in one domain, a memory function is imparted, so that flicker-free still images can be realized. Since one pixel consists of domains in the order of $\mu m$ whose threshold voltages differ from one another, a continuous gray-scale display becomes possible.

In FIG. 1, among the threshold voltages at which the transmittance is varied, the threshold voltage is taken as $V_{th1}$ at a transmittance of 10% and as $V_{th2}$ at a transmittance of 90%, the width of the variation of the threshold voltage, i.e. $\Delta V_{th}=V_{th2}-V_{th1}$, is not smaller than 2 volts. The microdomains should be present at a rate of 300 microdomains, with a size of larger than 2 $\mu m\phi$, per $mm^2$ when the transmittance is 25%. This is schematically shown in FIG. 2A wherein microdomains are indicated by MD. By the presence of the microdomains which are fine light-transmitting portions, a half-tone picture (transmittance) can be realized. Such a microdomain structure assumes a so-called starry sky and will be hereinafter referred to as "starlight texture".

According to this starlight texture, the light-transmitting portions MD based on the microdomains may be enlarged in area (or increased in transmittance) as shown by dot-and-dash circle in FIG. 2A, or may be reduced in size (or decreased in transmittance), depending on the applied voltage. Thus, the transmittance can be arbitrarily controlled depending on the applied voltage. In contrast, in known structures or textures shown in FIG. 2B, the width of the threshold voltage is so small that light-transmitting portions D are abruptly increased in number or disappear depending on the applied voltage, making it very difficult to make an analog gray-scale display.

Figure 3:
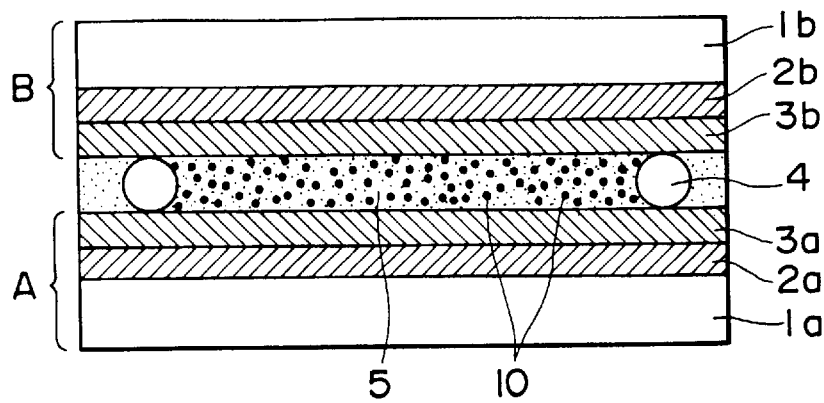
FIG. 3 is a schematic sectional view of a liquid crystal display device according to one embodiment of the invention.
Figure 4:
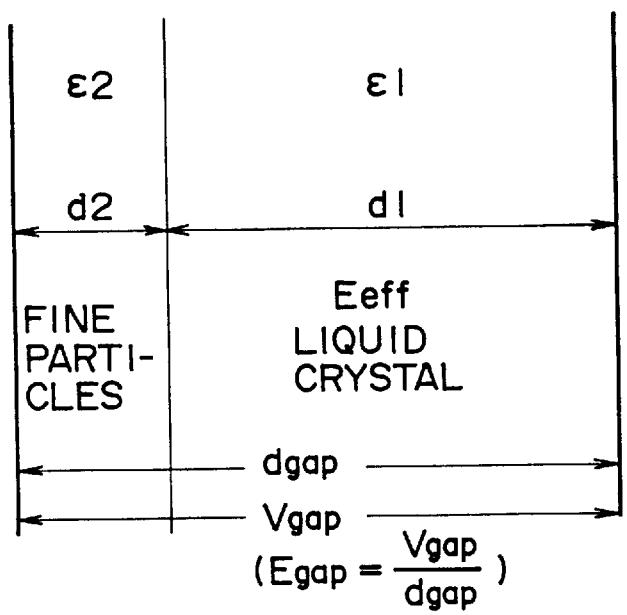
FIG. 4 is a schematic view illustrating an effective electric field in the liquid crystal of the liquid crystal device.
Figure 36:
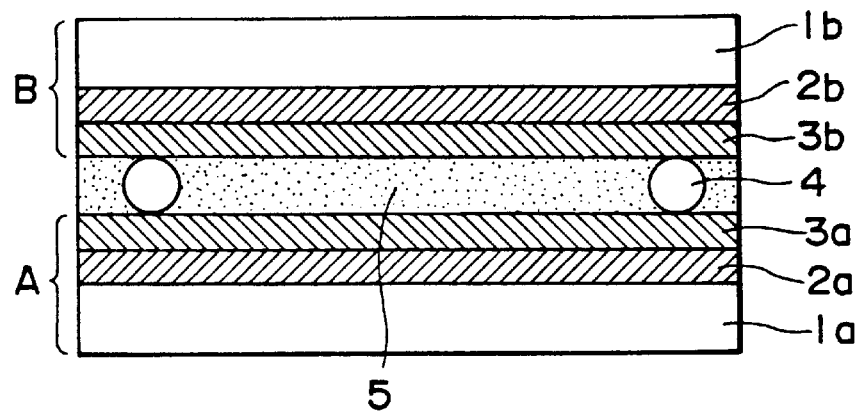
FIG. 36 is a schematic sectional view of a prior art liquid crystal display device.
Figure 37:
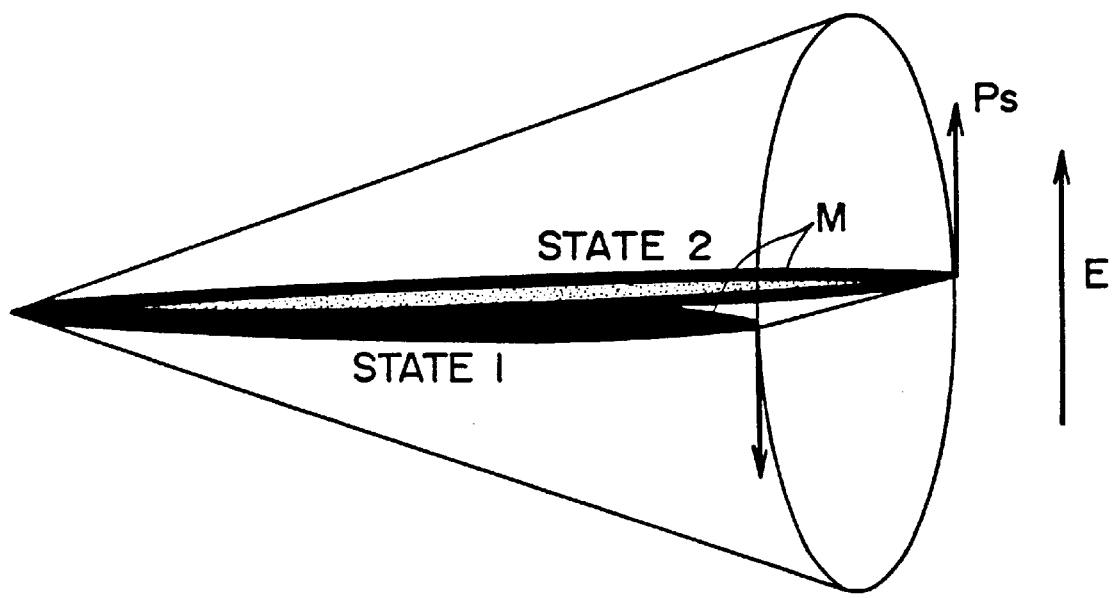
FIG. 37 is a schematic view illustrating the behavior of a ferroelectric liquid crystal.

In the practice of the invention, the microdomains can be formed by dispersing ultrafine particles in a liquid crystal. FIG. 3 shows an FLC display having a fundamental structure as shown in FIG. 36 and is not particularly described except that ultrafine particles 10 are dispersed in the liquid crystal 5.

The variation of the threshold voltage caused by the ultrafine particles 10 is principally set forth. When the size of the ultrafine particles 10 is taken as $d_2$, the dielectric constant of the particles 10 as $\epsilon_2$, the thickness of the liquid crystal 5 except for the ultrafine particles 10 as $d_1$, and the dielectric constant of the liquid crystal 5 as $\epsilon_1$, the electric field, Eeff, exerted on the ultrafine particles can be expressed as follows.

$$\text{Eeff}=(\epsilon_2/(\epsilon_1 d_2+\epsilon_2 d_1))\times \text{Vgap} \quad (1)$$

Accordingly, when ultrafine particles whose dielectric constant is smaller than that of the liquid crystal is added ($\epsilon_2 < \epsilon_1$), this leads to the incorporation of fine particles ($d_2$) whose size is smaller than the total thickness dgap ($=d_1+d_2$) of the liquid crystal. Thus, Eeff<Egap Eventually, the liquid crystal is applied with the electric field, Eeff, which is greater than that of a fine particles-free liquid crystal (Egap).

Gathering the above, the following conclusion is obtained.

When $\epsilon_1 > \epsilon_2$, Eeff<(Vgap/($d_1+d_2$)=Vgap/dgap=Egap.

When $\epsilon_1 = \epsilon_2$, Eeff=Egap.

When $\epsilon_1 < \epsilon_2$, Eeff>Egap.

In any case, the effective electric field, Eeff, acted on the liquid crystal is changed by addition of the ultrafine particles in such a way that different effective electric fields are applied to the liquid crystal at domains where no ultrafine particles exist and at domains where the ultrafine particles exist. As a result, when the same electric field, Egap, is applied, these domains are divided into two groups including one group wherein inverted domains are produced and the other group wherein any inverted domains are not produced, thereby developing a starlight texture as shown in FIG. 2A.

From the above, it will be seen that the starlight texture is suitable for realizing a continuous gray-scale, under which different transmittances (two or more gray-scale levels) can be obtained by controlling an applied voltage (magnitude and pulse width) under the addition of ultrafine particles. In contrast, mere presence of fine particles as in prior art results in the structure as shown in FIG. 2B. Especially, when fine particles with a size of 0.3 to 2 μm are placed in a fine gap of about 2 μm, an intended display performance cannot be attained. If the gap is not narrow, color shading will be produced owing to the presence of the fine particles. This will be described in more detail in comparative examples appearing hereinafter. In the practice of the invention, such defects can be overcome and intended characteristic properties can be obtained.

The ultrafine particles which are added to the liquid crystal are not critical provided that such fine particles serve to distribute the intensity of an effective electric field which is applied to the liquid crystal 5 existing between the facing transparent electrode layers 2a, 2b of FIG. 3. For instance, a mixture of fine particles consisting of a plurality of materials having different dielectric constants may be used. By the presence of fine particles having different dielectric constants, the distribution of the dielectric constant is formed in the respective pixels. As a consequence, when an external electric field is applied uniformly to the transparent electrode layers 2a, 2b of the pixel, the effective electric field intensity applied to the liquid crystal in the pixel can be distributed. Thus, the width of the threshold voltage for switching the liquid crystal (especially, a ferroelectric liquid crystal) between the bistable states can be widened, enabling one to make an analog gray-scale display in one pixel.

Where the fine particles having the same dielectric constant are used, a size distribution is appropriately controlled to obtain similar results. In this case, the presence of fine particles having the same dielectric constant but having different sizes leads to the distribution in thickness of the liquid crystal layer. As a result, when an external electric field is uniformly applied between the transparent electrode layers 2a, 2b in one pixel, the intensity of the effective electric field applied to the liquid crystal in the pixel is distributed, with the possibility of making an analog gray-scale display in the pixel. The particle size distribution should preferably be wider because a better analog gray-scale display is obtained.

The fine particles added to the liquid crystal should preferably have a pH on the surface of not less than 2.0. This is because if the pH is less than 2.0, acidity is too strong, the liquid crystal is liable to degrade by the attack of protons.

The fine particles should preferably be present in the liquid crystal in an amount of from 0.1 wt % to 50 wt %. If the amount is too large, the particles are liable to coagulate, making it difficult to develop the starlight texture. In addition, the injection of liquid crystal becomes difficult.

Usable fine particles include particles of carbon black and/or titanium oxide. Preferably, carbon black should be one which is prepared by the furnace method and titanium oxide should be amorphous titanium oxide. The carbon black prepared according to the furnace method has a relatively wide size distribution. The amorphous titanium oxide has good surface properties and good durability. The gray-scale display characteristics can be appropriately controlled by controlling the size distribution. It is preferred that the standard deviation of the size distribution is not less than 9.0 nm, within which a gentle variation of the transmittance is ensured. In addition, the specific gravity of the fine particles is preferably 0.1 to 10 times that of the liquid crystal in view of preventing settlement of the particles during their dispersion in the liquid crystal. The fine particles should preferably be surface treated with silane coupling agents in order to exhibit good dispersability.

In the practice of the invention, the fine particles should be present between the facing electrodes, but it is of no importance where the particles are present. More particularly, the particles may be present in the liquid crystal, or in or on the liquid crystal alignment film.

In the liquid crystal device of the invention, the angle of inclination of the liquid crystal layer at regions in the vicinity of the alignment film should differ from that in bulk regions other than the first-mentioned regions. Moreover, it is preferred that there are at least two X-ray diffraction intensity peaks, which exhibit the angles of inclination of the liquid crystal layer, at an incident angle of X-ray of not larger than 90° or not less than 90°. In the case, it is also preferred that the half width of the peaks of the X-ray diffraction intensity is not smaller than 3°, with the better likelihood toward a tone or gradation display.

In the practice of the invention, an apparent tilt angle (cone angle) of liquid crystal molecules which constitute a plurality of domains having different threshold voltages should preferably be varied by ±1° or over from the monodomain state. The temperature dependence of the cone angle of liquid crystal molecules should preferably be smaller than that in the monodomain state The starlight texture structure appears by addition of fine particles in a liquid crystal as set out hereinbefore. Such a structure may also be developed when the alignment film has been annealed. Basically, ferroelectric liquid crystals have usually a layer structure which is of a book shelf or chevron. In contrast, the starlight texture structure has neither of the structures but is one wherein the angle of inclination of the layer in the vicinity of the surface of the alignment film is different from that of the bulk regions.

The reason why the the tilt angle becomes smaller than in the mondomain state is considered as follows. Although experimentally confirmed, the smaller tilt angle is symmetric relative to the direction of the alignment treatment, so that the liquid crystal molecules on the surface of the alignment film are aligned parallel to the direction of the alignment film. The liquid crystal molecules on the alignment film surface are not switched by application of an electric field and become immobilized. Accordingly, the apparent tilt angle is observed as being smaller than in the case where the liquid crystal molecules on the surface are switched. An increase of the tilt angle is considered to result from an increase over an angle of inclination of the layer or to occur owing to the variation caused by an increasing pretilt angle.

The distribution width of the apparent pretilt angle of the liquid crystal molecules should preferably be not smaller than 6°, more preferably not smaller than 8°, in one pixel. When the pretilt angle of the liquid crystal molecules is distributed within a range where the alignment of the liquid crystal is not disturbed, there can be effectively formed a number of microdomains whose threshold values for switching between the bistable states of the liquid crystal within one pixel are different from one another. This may be realized, for example, by forming a specific type of thin film on a SiO oblique vacuum deposition layer.

A substance selected from the group consisting of charge transfer complexes, organic pigments, metals, oxides and fluorides is formed on the alignment film. This is more particularly described with reference to FIGS. 5 to 7.

Figure 5:
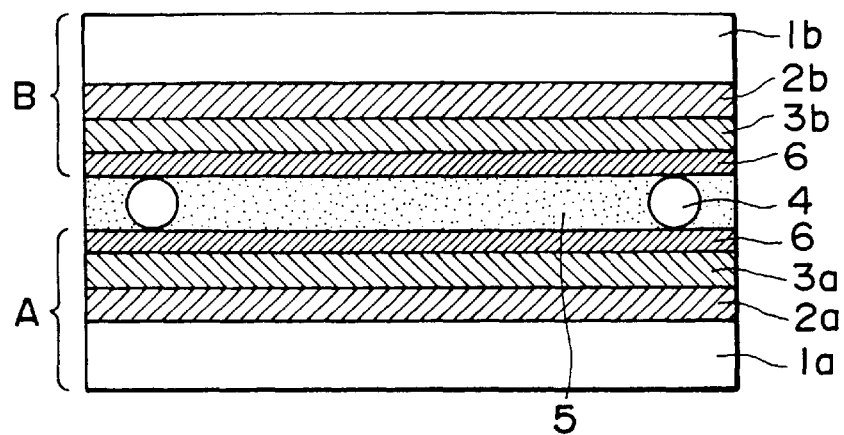
FIG. 5 is a schematic sectional view of a liquid crystal element according to another embodiment of the invention.

FIG. 5 shows a liquid crystal display device similar to that of FIG. 3 except that a charge transfer complex thin film 6 is formed on each of the SiO oblique vacuum deposition layers 3a, 3b. More specifically, a builtup structure A is provided as having a substrate 1a, a transparent electrode 2a, a liquid crystal alignment film 3a, such as a SiO oblique vacuum deposition layer, for realizing high contrast and good domains and a charge transfer complex thin film 6 built up in this order. Likewise, a builtup structure B has a substrate 1b, a transparent electrode 2b, a liquid crystal alignment film 3b, such as a SiO oblique vacuum deposition layer, and a charge transfer complex thin film 6 built up in this order. The structures 3A and 3B are so arranged that the liquid crystal alignment layers 3a, 3b are in face-to-face relation.

Figure 6A:
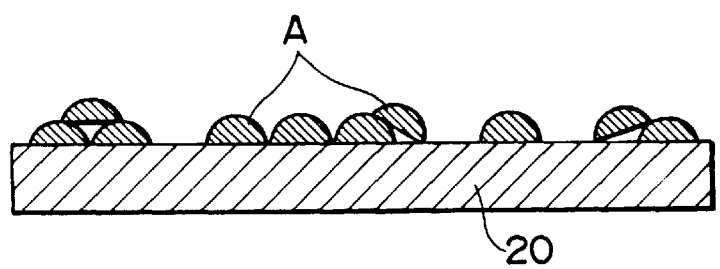
FIGS. 6A and 6B are, respectively, schematic side and plan views illustrating vacuum deposition of a substance other than SiO on a SiO oblique deposition film so that liquid crystal molecules have a distribution of pretilt angles.
Figure 6B:
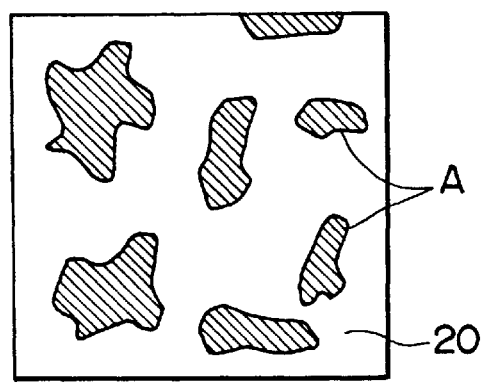

In this device, the charge transfer complex thin films 6 are, respectively, vacuum deposited on the SiO oblique vacuum deposition layers 3a, 3b. The vacuum deposition is preferably effected in the following manner. The substrates 1a, 1b are, respectively, formed with the electrode 2a, 2b and the SiO oblique vacuum deposition layers 3a, 3b to provide substrate bases 20 as shown in FIGS. 6A and 6B. Then, a substance whose surface energy is different from that of SiO of the SiO oblique vacuum deposition layer is vacuum deposited as islands A of FIGS. 6A and 6B. Subsequently, the charge transfer complex thin film is formed on the islands-bearing SiO layer 3a or 3b. By this, it becomes possible that the pretilt angle of the liquid crystal molecules is distributed in a favorable fashion.

The substances whose surface energy is different from that of SiO may include various organic materials such as, for example, charge transfer complexes themselves, electron acceptors which are one constituent of the charge transfer complexes, and electron donors which are the other constituent, and inorganic materials such as metals, oxides and the like. This will be described in more detail hereinafter.

In the liquid crystal display device shown in FIG. 5, after injection of a liquid crystal into the cell gap of the liquid crystal cell, the cell is subjected to treatment with an electric field. This will ensure an intended distribution of the pretilt angle of the liquid crystal molecules. As a result, fine multidomains whose threshold values for switching the liquid crystal between bistable states differ from one another are formed in one pixel, thereby enabling one to realize an analog tone display while keeping a high contrast.

The potential for the electric field treatment should preferably be in the range of ±3V to ±50V (i.e. $V_{p-p}$=6V to 100V). The frequency and treating time may be arbitrarily selected. In general, the electric field treatment is carried out by application of a rectangular wave of 100 Hz±30V for about one minute.

The charge transfer complex thin films used above are ones which consist of complexes of electron donor molecules indicated in Table 1 and electron acceptor molecules indicated in Table 2, and include, for example, thin films of charge transfer complexes indicated in Tables 3 to 5. The thickness of the charge transfer complex thin film is preferably in the range not larger than 300 angstroms, preferably from 40 to 80 angstroms.

TABLE 1

| Abbreviation | Name of Compound |
| --- | --- |
| TTF | tetrathiafulvalene |
| DHTTF | dicycylotetrathiafulvalene |
| DMTTF | dimethyltetrathiafulvalene |
| TMTTF | tetramethyltetrathiafulvalene |
| HMTTF | hexamethylenetetrathiafulvalene |

TABLE 1-continued

| Abbreviation | Name of Compound |
| --- | --- |
| DSDTF | diselenadithiafulvalene |
| DMDSDTF | dimethyldiselenadithiafulvalene |
| HMDSDTF | hexamethylenediselenadithiafulvalene |
| TSF | tetraselenafulvalene |
| TMTSF | tetramethyltetraselenafulvalene |
| HMTSF | hexamethylenetetraselenafulvalene |
| TTT | tetrathiotetracene |
| TST | tetraselenatetracene |
| Q | quinoline |
| NMQ | N-methylquinolinium iodide |

TABLE 2-A

| Abbreviation | Name of Compound |
| --- | --- |
| Ad | acridine |
| NPM | N-methylphenazium methylsulfate |
| DEPE | 1,2-di(N-ethyl-4-pyridinium)ethylene |
| MTCNQ | 2-methyl-7,7.8.8-tetracyanoquinodimethane |
| DMTCNQ | 2.5-dimethyl-7,7,8,8-tetracyanoquinodimethane |
| DETCNQ | 2,5-diethyl-7,7,8,8-tetracyanoquinodimethane |
| MOTCNQ | 2-methoxy-7,7,8,8-tetracyanoquinodimethane |
| CTNQ | 2-chloro-7,7,8,8-tetracyanoquinodimethane |
| BTCNQ | 2-bromo-7,7,8,8-tetracyanoquinodimethane |
| DBTCNQ | 2,5-dibromo-7,7,8,8-tetracyanoquinodimethane |
| CMTCNQ | 2-chloro-5-methyl-7,7,8,8-tetracyanoquinodimethane |
| BMTCNQ | 2-bromo-5-methyl-7,7,8,8-tetracyanoquinodimethane |
| IMTCNQ | 2-iodo-5-methyl-7,7,8,8-tetracyanoquinodimethane |
| TNAP | 11,11,12,12-tetracyano-2,6-tetracyanoquinodimethane |
| HCB | 1,1,2,3-hexacyanobutadiene |
| TCNQ | tetracyanoquinodimethane |

TABLE 3

Examples of Charge Transfer Complexes tetrathiafulvalene-2-methyl-7,7,8,8,-tetracyanoquinodimethane
tetrathiafulvalene-2,5-dimethyl-7,7,8,8,-tetracyanoquinodimethane
tetrathiafulvalene-2,5-diethyl-7,7,8,8,-tetracyanoquinodimethane
tetrathiafulvalene-2-methoxy-7,7,8,8,-tetracyanoquinodimethane
tetrathiafulvalene-2-chloro-7,7,8,8,-tetracyanoquinodimethane
tetrathiafulvalene-2-bromo-7,7,8,8,-tetracyanoquinodimethane
tetrathiafulvalene-2,5-dibromo-7,7,8,8,-tetracyanoquinodimethane
tetrathiafulvalene-2-chloro-5-methyl-7,7,8,8,-tetracyanoquinodimethane
tetrathiafulvalene-2-bromo-5-methyl-7,7,8,8,-tetracyanoquinodimethane
tetrathiafulvalene-2-iodo-5-methyl-7,7,8,8,-tetracyanoquinodimethane
ditetrathiafulvalene-2-chloro-5-methyl-7,7,8,8,-tetracyanoquinodimethane
tetrathiafulvalene-11,11,12,12-tetracyano-2,6-naphthoquinodimethane
ditetrathiafulvalene-1,1,2,3-hexacyanobutadiene
tetrathiafulvalene-chloride$_{0.71}$
tetrathiafulvalene-bromide$_{0.70-0.76}$
tetrathiafulvalene-iodide$_{0.70-0.76}$

TABLE 4-A

Examples of Charge Transfer Complexes tetrathiafulvalene-thiocyanate$_{0.55-0.73}$
tetrathiafulvalene-seleninic cyanate$_{0.55-0.62}$
dihydroxytetrathiafulvalene-tetracyanoquinodimethane
dihydroxytetrathiafulvalene-2-bromo-5-methyl-tetracyanoquinodimethane
dihydroxytetrathiafulvalene-2,5-diethyl-7,7,8,8-tetracyanoquinodimethane
dimethyltetrathiafulvalene-7,7,8,8-tetracyanoquinodimethane
n-methylquinolium iodide-11,11,12,12-tetracyano-2,6-naphthoquinodimethane
1,2-di(n-ethyl-4-pyridinium)ethylene-7,7,8,8-tetracyanoquinodimethane
tetramethyltetrathiafulvalene-2-methyl-7,7,8,8-tetracyanoquinodimethane

TABLE 4-B

Examples of Charge Transfer Complexes hexamethylenetetrathiafulvalene-7.7.8.8-tetracyanoquinodimethane
hexamethylenediselenadithiafulvalene-7.7.8.8-tetracyanoquinodimethane
dimethyldiselenadithiafulvalene-7.7.8.8-tetracyanoquinodimethane
tetraselenafulvalene-7,7,8,8-tetracyanoquinodimethane
tetraselenafulvalene-bromide$_{0.8}$
tetraselenafulvalene-methyl-7,7,8,8-tetracyanoquinodimethane$_x$-7,7,8,8-tetracyanoquinodimethane$_{1-x}$
tetramethyltetraselenafulvalene-7,7,8,8-tetracyanoquinodimethane
tetramethylselenafulvalene-2,5-dimethyl-7,7,8,8-tetracyanoquinodimethane

TABLE 5-A

Examples of Charge Transfer Complexes hexamethylenetetraselenafulvalene-7.7.8.8-tetracyanoquinodimethane
hexamethylenetetraselenafulvalene-11,11,12,12-tetracyano-2,6-naphthoquinodimethane
tetrathiotetracene-7,7,8,8-tetracyanoquinodimethane 2
tetrathiotetracene-2,5-dimethyl-7,7,8,8-tetracyanoquinodimethane
tetrathiotetracene-2,5-diethyl-7,7,8,8-tetracyanoquinodimethane
tetrathiotetracene-5-methoxy-7,7,8,8-tetracyanoquinodimethane
tetrathiotetracene-2,5-dimethoxy-7,7,8,8-tetracyanoquinodimethane
tetrathiotetracene-2-methoxy-S-ethoxy--7,7,8,8-tetracyanoquinodimethane
tetrathiotetracene-2,5-diethoxy-7,7,8,8-tetracyanoquinodimethane
tetrathiotetracene-2-bromo-5-methyl-7,7,8,8-tetracyanoquinodimethane

TABLE 5-B

Examples of Charge Transfer Complexes tetrathiotetracene-2-iodo-5-methyl-7,7,8,8-tetracyanoquinodimethane
tetrathiotetracene-iodide$_{1-1.5}$
tetrathiotetracene-11,11,12,12-tetracyanonaphthoquinodimethane
(tetrathiotetracene$_{0.5}$-tetraselenacene$_{0.5}$-7,7,8,8-tetracyanoquinodimethane 2)
tetraselenacene-tetracyanoquinodimethane

TABLE 5-B-continued

Figure 7A:
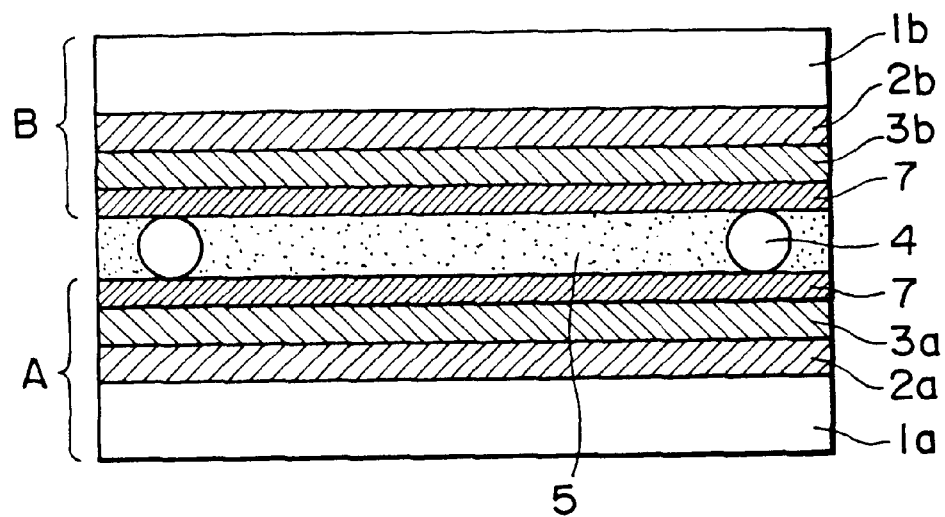
FIGS. 7A and 7B are, respectively, a schematic sectional view of a liquid crystal display device according to a further embodiment of the invention.

Examples of Charge Transfer Complexes quinoline-7,7,8,8-tetracyanoquinodimethane
n-methylquinolium iodide-7,7,8,8-tetracyanoquinodimethane FIG. 7A is a schematic sectional view of a liquid crystal display device which includes an uppermost thin film layer 7 on each of the liquid crystal alignment layers or SiO oblique vacuum deposition layers 3a, 3b. The uppermost layer 7 consists of an organic conductive compound, oxide, fluoride or metal. By the formation of the thin film 7, fine multidomains whose threshold values for switching the liquid crystal between the bistable states are formed.

The organic conductive compounds used to form the thin film 7 include a variety of organic conductive compounds. For instance, a ytterbium diphthalocyanine (YbPc$_2$) thin film may be used. When organic conductive compounds having a conductivity of not less than $1 \times 10^{-6}$ S/cm are used, a higher response speed is attained. The thin film of the organic conductive compound is preferably in the range of not larger than 300 angstroms, more preferably from 40 to 80 angstroms.

The oxide films may be those films of oxide compounds such as, for example, SiO, SiO$_2$, MgO, TiO, TiO$_2$, Al$_2$O$_3$ and the like. The thickness of the oxide thin film is preferably in the range of not larger than 100 angstroms.

The fluoride thin films are those films of various fluorides such as MgF$_2$, CaF$_2$, AlF$_3$ and the like. The thickness of the fluoride thin film is preferably not larger than 100 angstroms.

The metal thin films may be made of metals such as Au, Ag, Al, Cu, Pt and the like. The thickness of the metal thin film is preferably not larger than 100 angstroms.

The liquid crystal display device of this embodiment may be fabricated by a usual manner, like the device of FIG. 3. For instance, a transparent ITO layer is first formed on a glass substrate, followed by patterning in a desired shape according to a lithographic procedure. Then, SiO is vacuum deposited obliquely relative to the substrate.

Subsequently, a charge transfer complex, oxide, fluoride or metal is subjected to vacuum deposition, preferably from the direction vertical to the substrate, thereby forming a thin film thereof on the SiO oblique vacuum deposition layer of the builtup structure. Two builtup structures are assembled to obtain a liquid crystal cell. A liquid crystal in which fine particles are uniformly dispersed is injected into the cell gap to obtain a liquid crystal display device. The liquid crystal alignment film may be rubbed polyimide film, or SiO oblique vacuum deposition film, SiO$_2$ oblique vacuum deposition film, magnesium fluoride oblique vacuum deposition film, calcium fluoride oblique vacuum deposition film or the like.

If the alignment film consists of a silicon oxide vacuum deposition film, it is preferred from the standpoint of developing a starlight texture structure that after the vacuum deposition, the film is subjected to annealing to change surface properties. This is true of all the display devices shown in FIGS. 3, 5 and 7.

Figure 7B:
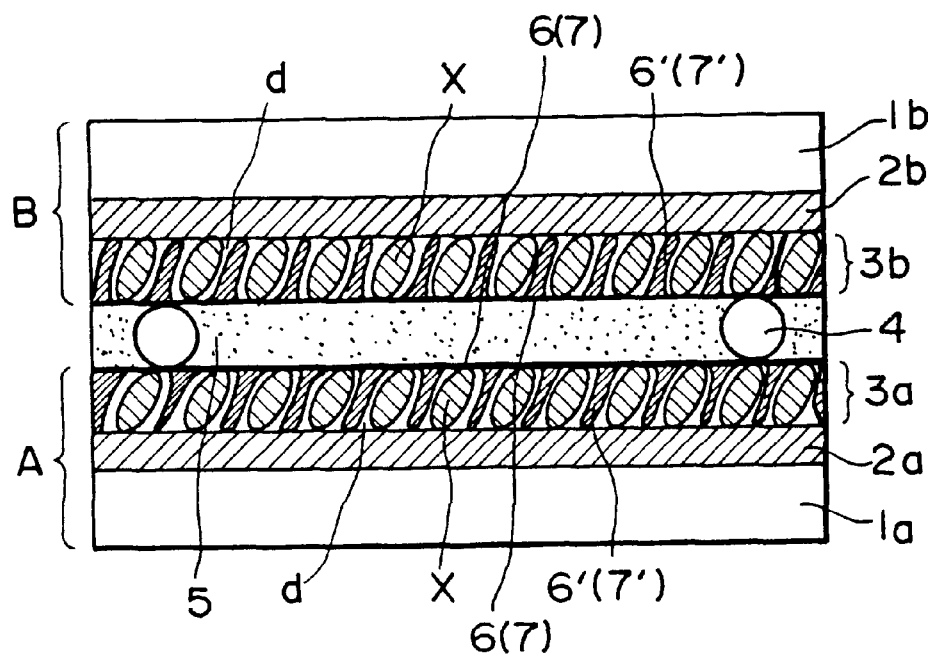

It has been confirmed through SEM and electrochemical analyses that the SiO oblique vacuum deposition layer used as the alignment film is constituted of a multitude of SiO rhombic columns X as shown in FIG. 7(b) and that interstices d are present in the SiO oblique vacuum deposition layer along the SiO rhombic columns. When the charge transfer complex thin film 6 or 7 formed on the SiO oblique vacuum deposition layer is thermally treated, at least a part 6' or 7' of the constituent material of the thin film 6 or 7 may be present between or incorporated in the interstices d of the rhombic columns X of the SiO layer. This has also been confirmed through RAS measurement of FT-IR (Fourier transformation infrared spectroscopy). For instance, the angle of inclination of the rhombic columns X is about 45° and the ratio of the interstices amounts to about 2% of the total surface area.

This eventually leads to a smaller thickness of the thin film 6 or 7, and part of the SiO oblique vacuum deposition layer is caused to be in direct contact with the liquid crystal molecules, thereby keeping the alignment of the liquid crystal molecules. More particularly, as shown in FIG. 7B, the liquid crystal display device wherein at least a part 6' or 7' of the charge transfer complex thin film 6 or 7 is incorporated into the interstices d of the SiO rhombic columns X of the SiO oblique vacuum deposition layers 3a, 3b can keep the alignment of the ferroelectric liquid crystal and can reduce the accumulated surface charge by the spontaneous polarization of FLC molecules or impurities of FLC mixtures. This is considered for the following reason: when, for example, the thin film is made of tetrathiafulvalene-tetracyanoquinodimethane complex (TTF-TCNQ), the CN groups are tilted from the substrate parallel and the highest conductive direction of TFT-TCNQ complex alignes along the rhombic columns of SiO.

More particularly, it is assumed that the conductive material such as the above complex (TTF-TCNQ) serves to connect between the liquid crystal 5 and the electrodes 2a, 2b, which results in good response at the time of application of a voltage without adversely influencing the alignment of the liquid crystal, thereby ensuring a high speed response.

The conductive materials are, as stated hereinabove, selected from charge transfer complexes, organic pigments, metals, oxides and fluorides and are critical with respect to the types of conductive materials including metals, organic materials and inorganic materials provided that they have conductive in nature.

The electric conductivity of the conductive material should preferably be higher than that of the vacuum deposition thin film and/or the liquid crystal and should preferably be not lower than $1 \times 10^{-12}$ S/cm$^2$, more preferably not lower than $1 \times 10^2$ S/cm$^2$ and most preferably not lower than $1 \times 10^2$ S/cm$^2$. For instance, with the above TTF-TCNQ complex, it has a conductivity of $1 \times 10^2$ S/cm$^2$.

In order to permit at least a part 6' or 7' of FIG. 7B of the conductive material to intervene between adjacent rhombic columns of the oblique vacuum deposition film, the conductive material is formed as a thin film with a thickness of from 3 to 40 nm by a vacuum deposition method and thermally treated or fired at a temperature of 50 to 160° C. thereby causing the part to be charged inbetween the rhombic columns. Alternatively, the conductive material may be charged in the form of a liquid.

As stated hereinbefore, since the thin film 6 or 7 is made of a conductive material and part of the material is intervened between adjacent rhombic columns X, the film thickness is made so small that the polarization of ferroelectric liquid crystal molecules is mitigated and a phenomenon of lowering an effective voltage relative to an applied voltage owing to the polarization of liquid crystal molecules (i.e. an anti-electric field phenomenon) can be suppressed. Thus, the difference between the applied voltage and the effective voltage can be reduced, making it possible to fasten the response speed of the ferroelectric liquid crystal while realizing an analog gray-scale display at a high contrast. In general, the response speed is higher by about 2 to 5 times than that of the case where only an alignment film such as of SiO is used wherein no film of a conductive material is formed.

The present invention is described in more detail by way of examples. Comparative examples are also shown.

EXAMPLES 1, 2 AND COMPARATIVE EXAMPLES 1, 2

To 100 mg of a ferroelectric liquid crystal composition CS-1014 (Example 1) or CS-1028 (Example 2) commercially available from Chisso Petrochemical Co., Ltd. was added 1 mg of carbon black Mogul L of Cabot Corp., which was ultrafine carbon black particles, followed by heating to 100° C. (i.e. heating to an isotropic temperature) and uniform dispersion by use of a ultrasonic homogenizer. The above procedure was repeated using no carbon black for comparison (Comparative Examples 1 and 2 corresponding to Examples 1 and 2, respectively).

Each composition was heated to an isotropic temperature in vacuum and poured into a test cell. The alignment film of the test cell was a SiO oblique vacuum deposition film. The angle of the deposition was 85° with respect to the normal line of the substrate, and the substrate temperature was 170° C. with a film thickness of 50 nm. After completion of the vacuum deposition, the vacuum deposition film was annealed in air at 300° C.

In the fabrication of the liquid crystal cell, a glass substrate on which a 400 angstroms thick transparent ITO film having a surface resistance of 100 $\Omega$/cm$^2$ was formed by sputtering was provided, on which a 500 angstroms thick SiO oblique vacuum deposition film was formed as a liquid crystal alignment film by heating (resistance heating) a tantalum boat having therein SiO powder with a purity of 99.99% (commercially available from Furuuchi Chem. Co., Ltd.).

The resultant two glass substrates were assembled using spacers having a diameter of 1.6 $\mu$m (true spheres: commercially available from Catalyst Chemical Co., Ltd.) and a UV-curing adhesive (Photorec: commercially available from Sekisui Fine Chemicals Co., Ltd.) in such a way that the SiO oblique vacuum deposition films were facing each other but the directions of the vacuum deposition were opposite to each other, thereby obtaining a liquid crystal cell. The ferroelectric liquid crystal was injected into the cell gap to obtain a liquid crystal cell. The cell was applied with an AC electric field of a frequency of 100 Hz and ±35V to obtain a liquid crystal display device.

The liquid crystal cells comprising carbon black in the liquid crystal exhibited a structure which was completely different from the monodomain structure of the cell containing no carbon black. More particularly, the texture structure of the cell of the invention was such that when an electric field was applied to the cell by DC, no lateral flow took place in response to the magnitude of a voltage and the size of the domains was varied in proportional to the magnitude of the voltage. Since such a texture looked Just like starlight in the sky, it was named as starlight texture. The characteristic properties of the starlight textures and the known systems are shown below for comparison.

TABLE 6

(Comparison of Starlight Textures With Known Systems)

| | Example 1 | Comp. Ex. 1 | Example 2 | Comp. Ex. 2 |
|---|---|---|---|---|
| Structure | starlight texture (I) | prior art structure (I) | starlight texture (II) | prior art structure (II) |
| Liquid Crystal | CS-1014 | CS-1014 | CS-1028 | CS-1028 |
| Cone Angle (electric field: on) | 25° | 45° | 43° | 42° |
| Cone Angle (electric field: off) | 16° | 43° | 42° | 38° |
| Width of Threshold Voltage (V) | 7 | 2 | 6 | 2 |
| Contrast | 70 | 70 | 70 | 76 |
| Pulse Width | 350 | 500 | 20 | 20 |

In these examples and comparative examples, the alignment films are arranged in non-parallel to each other. In the case, the prior art cells are known to have a bookshelf structure. With the starlight texture structure based on the present invention, the layer structure is considered to have an increasing number of domains on the surface of the alignment film wherein liquid crystal molecules are in an immobilized state relative to an electric field. Thus, it is considered that in the vicinity of the surface of the alignment film, the angle of inclination of the layer is changed. This is why when using CS-1014, the cone angle is likely to change at the time of the applied voltage being on and off. With the starlight textures, the cone angles are changed by ±1° or over on comparison with those of the monodomain structures (prior art systems).

Figure 8:
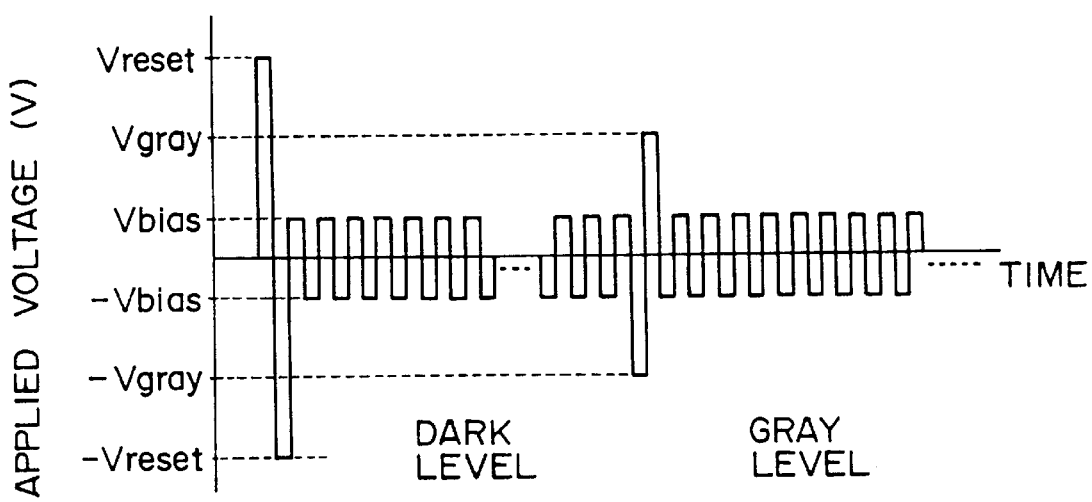
FIG. 8 is a pulse wave diagram for evaluating the relation between the applied voltage and the contrast ratio of a liquid crystal display device.

The liquid crystal display devices obtained above were subjected to measurement of the relation between the applied voltage and the contrast ratio in the following manner. A drive waveform as shown in FIG. 8 was applied to each display device under crossed Nicols. Initially, a reset pulse ($V_{reset}$ pulse) with a pulse width of 1 msec., was applied, followed by application of a grey pulse ($V_{gray}$ pulse) with a pulse width of 1 msec., which was less than the reset pulse. The degree of light transmission after the application of the reset pulse (dark level) and the degree of light transmission after the application of (grey level) were compared to determine a contrast ratio.

Figure 9:
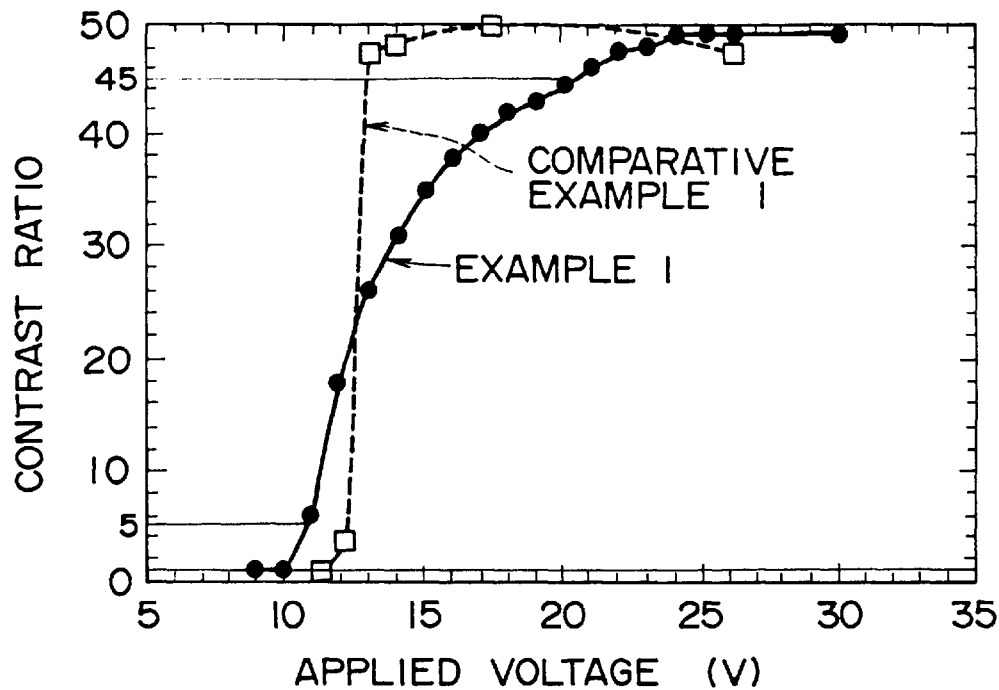
FIG. 9 is a graph showing the relation between the contrast ratio and the applied voltage of liquid crystal display devices of the invention and for comparison.

The results of the measurement of the variation in the contrast ratio (corresponding to a transmittance) relative to the applied voltage are shown in FIG. 9. In the figure, the starlight texture (I) of Example 1 and the prior art system (I) of Comparative Example 1 are indicated.

As will be apparent from the results, the liquid crystal display device of the example provides a contrast ratio which differs depending on the voltage. In addition, the threshold voltage for switching the ferroelectric liquid crystal between the bistable states (i.e. a width of variation of the threshold voltage within a contrast ratio range of 1/10 to 9/10 of the maximum value or within a transmittance range of 10 to 90%) is as wide as not smaller than 2 volts, giving evidence that an analog gray-scale display is possible. Accordingly, it is not necessary to provide an active element such as TFT for every pixel, with the possibility that images can be displayed in a simple matrix.

In contrast, it will be seen that with the liquid crystal display device of Comparative Example 1 wherein no carbon black is added, the threshold value has a sharp curve and has no analog tone or gradation property.

EXAMPLE 3

The general procedure of Example 1 was repeated except that CS-1014 was used as the liquid crystal, titanium oxide was used as ultrafine particles, i.e. 1 wt % of high dispersion-type IT-UD was added as selected from titania products of Idemitsu, thereby obtaining a liquid crystal cell. The titanium oxide used was characterized by its amorphousness and had an average size of 17 nm.

Figure 10:
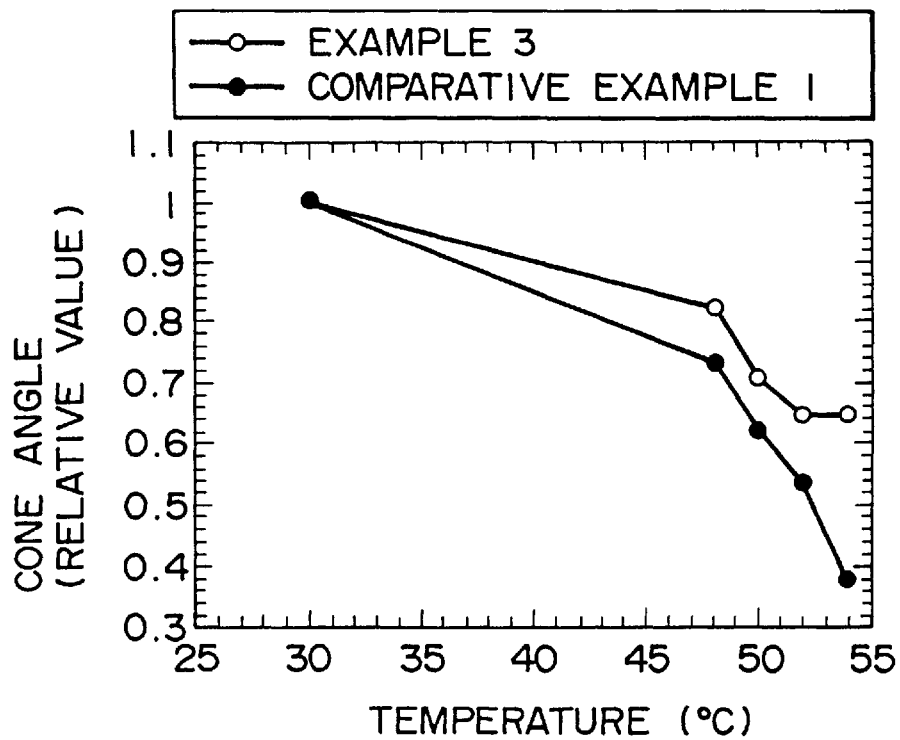
FIG. 10 is a graph showing the relation between the cone angle and the temperature of liquid crystal display devices of the invention and for comparison.

The device of Example 3 using titanium oxide ultrafine particles and the device of Comparative Example 1 using CS-1014 alone without use of any ultrafine particles were subjected to measurement of the temperature dependence on the angle of cone. The results are shown in FIG. 10 wherein the cone angle at 30° is taken as 1.

From the results, it will be seen that the starlight texture of this example is smaller in the temperature dependence on the cone angle. This is considered for the reason that the liquid crystal molecules on the surface are immobilized and the layer structure becomes stabilized against temperature, with the result that the cone angle is not narrowed to higher temperatures. With ordinary textures, when the temperature comes close to the vicinity of a phase transition point of from the SmA phase to the SmC phase, the tilt angle becomes gradually reduced. At the transition point, the tilt angle becomes zero. The degree of the reduction becomes conveniently smaller for the starlight texture.

EXAMPLE 4

Figure 11A:
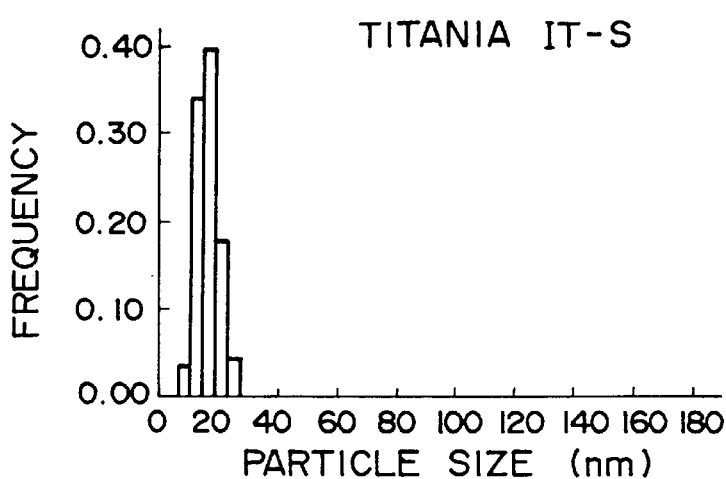
FIGS. 11A, 11B and 11C are, respectively, a size distribution for different types of titanium oxides.
Figure 11B:
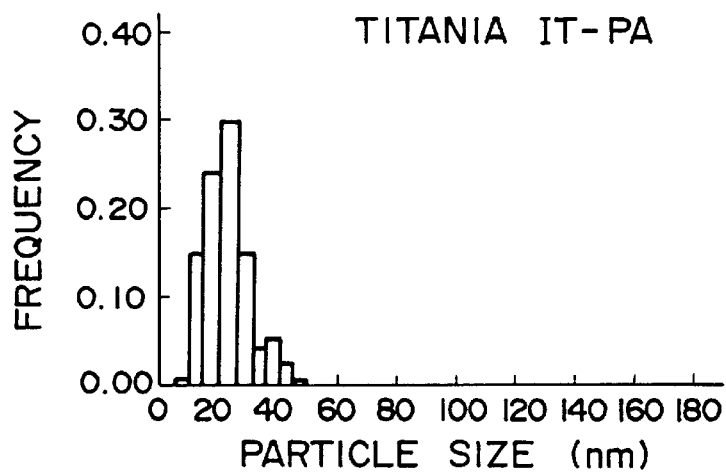
Figure 11C:
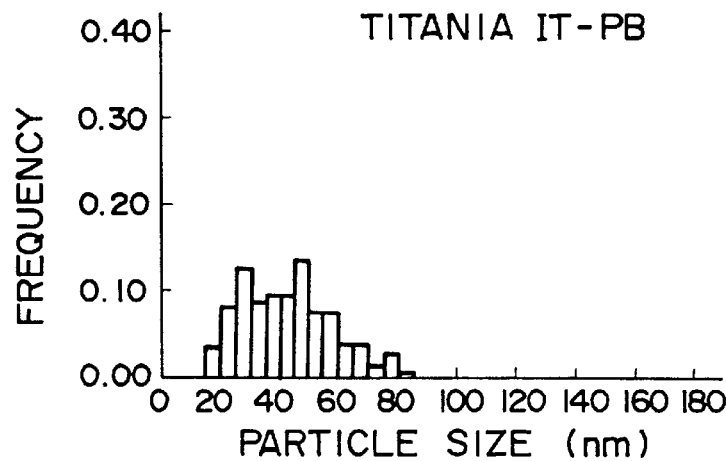

In the same manner as in Example 1, CS-1014 was used as the liquid crystal and the alignment film used was a SiO alignment film. Ultrafine particles used were three types of titania particles of Idemitsu IT-S, IT-PA and IT-PB, which had all hydrophilic surfaces and different size distributions, respectively. The average sizes of these particles IT-S, IT-PA and IT-PB were, respectively, 17 nm, 24 nm and 40 nm with size distributions being shown in FIG. 11 for the respective titania particles. Liquid crystal cells were fabricated in the same manner as in Examples 1 using the above ingredients.

The relation between the transmittance and the applied voltage is shown in FIG. 12 for the cells using 1 wt % of the respective titania ultrafine particles. From the figure, it will be seen that the gradient is decreased in the order of IT-S>IT-PA>IT-PB. Accordingly, the width of the threshold value and the variation in the applied voltage can be appropriately controlled by controlling the size distribution of the ultrafine particles. When the size distribution of the titanium oxide is widened, the width of the threshold value tends to be widened. The liquid crystal display devices obtained in this example have different contrast ratios depending on the voltage. The width of the threshold voltage for switching the ferroelectric liquid crystal between the bistable states is great, giving evidence that an analog gray-scale can be displayed. This ensures image display in a simple matrix without providing any active element such as TFT for every pixel.

Figure 13:
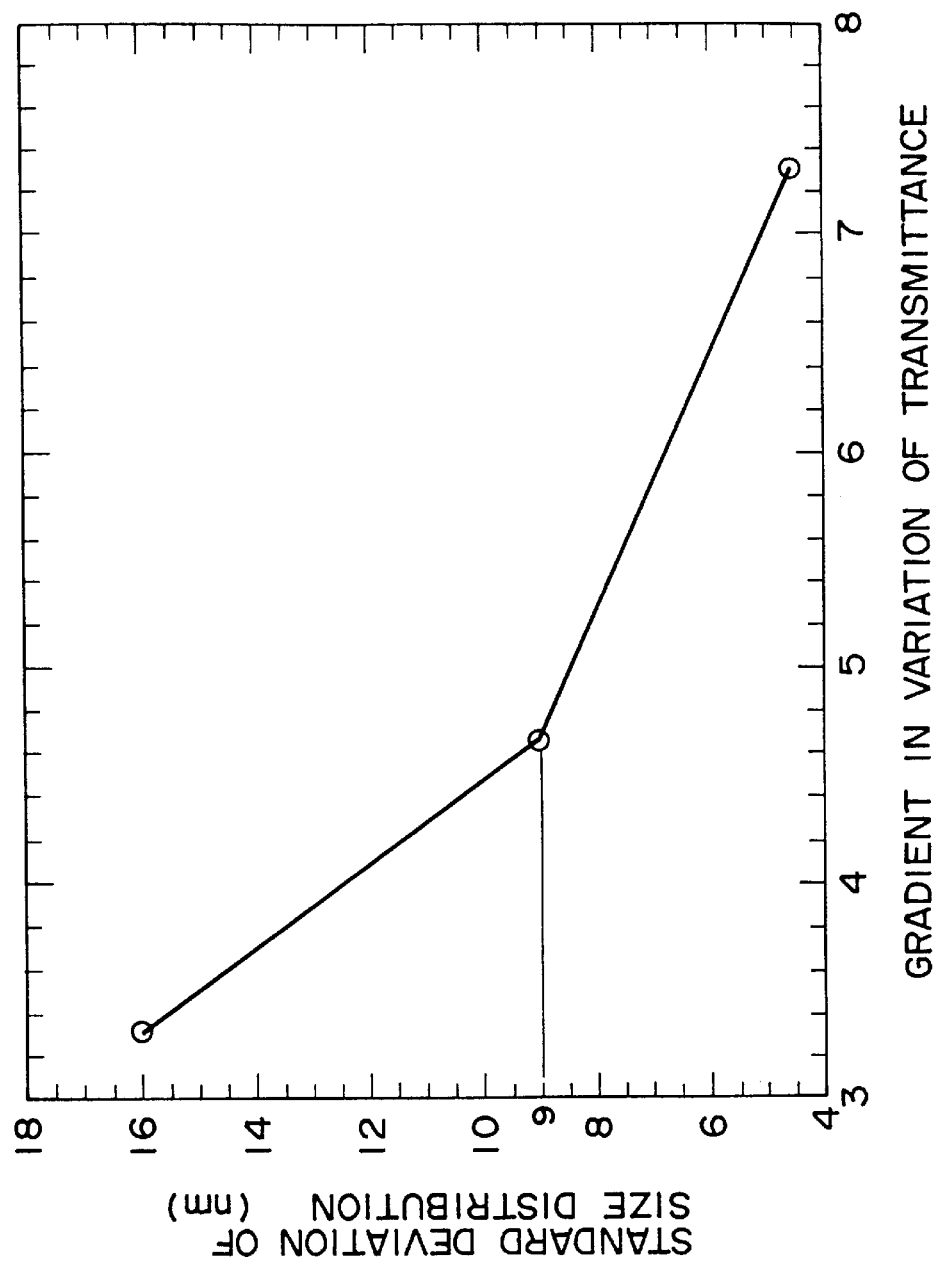
FIG. 13 is a graph showing the relation between the standard deviation of a size distribution and the gradient of the variation of a transmittance of a liquid crystal display device.

The relation between the standard deviation of the size distribution and the inclination of variation of the transmittance was determined, revealing that they are almost in a linear relation as shown in FIG. 13. More particularly, the control of the threshold voltage characteristic for tone display is possible by controlling the size distribution of the particles to be added. If the standard deviation is not less than 9.0 nm, a good inclination of variation of the transmittance (i.e. a good width of variation of the threshold voltage) is attained, making it easy to obtain a starlight texture structure.

EXAMPLE 5

The general procedure of Example 1 was repeated except that CS-1028 of Chisso Petrochemical Co., Ltd., was used as the liquid crystal instead of CS-1014 and 24 wt % of Mogul L was added to the liquid crystal, thereby obtaining a liquid crystal cell.

The cells of Examples 1 and 5 were subjected to measurement of the number of domains with a size of larger than 2 $\mu m\phi$ per $mm^2$ while controlling the voltage so that the transmittance was 25% provided that the transmittance was taken as 100% when the cell was in the brightest. The results are shown in Table 7 below.

TABLE 7

| | Liquid Crystal + Fine Particles | Number of Domains |
|---|---|---|
| Example 1 | CS-1014 (anti-parallel) + Mogul L 1 wt % | 100,000 |
| Example 5 | CS-1028 (anti-parallel) + Mogul L 24 wt % | 450 to 1075 |

With the CS-1014 system, the domains were observed through a microscope of 500 magnifications to count the number of the domains in a region of 20 $\mu m$ square. 40 domains were found. For calculation of the number of the domains per $mm^2$, 40 multiplied by 2500 made 100,000. With the CS-1028 system, the liquid crystal was observed at 72 magnifications to count the number of the domains in an area of 200 $\mu m$ square thereby finding out 18 to 43 domains. The calculation of the number of the domains per $mm^2$ revealed 450 to 1075 domains per $mm^2$.

Thus, it will be seen that the starlight texture structure based on the invention can be realized by the presence of a desired number of microdomains. It will be noted that with the CS-1028 system, the number of the domains is smaller than that of the CS-1014 system although the amount of the fine particles is larger and that the larger amount is considered to affect dispersability of the fine particles.

EXAMPLE 6

1) Formation of a SiO Oblique Vacuum Deposition Alignment Film and Method for fabricating Cells for Evaluation A 2.5 mm thick glass substrate having a sputtered ITO film with a surface resistance of 100 $\Omega/cm^2$ was provided so that the normal line of the glass substrate made an angle of 85° with respect to the vertical line. While keeping the glass substrate at 170° C. under conditions of a degree of vacuum of $8\times10^{-6}$ Torr., silicon monoxide (SiO) placed in a Ta boat with opened pinholes (Japan Backs Metal Co., Ltd.) and subjected to resistance heating at a deposition rate of 1 angstrom/second to form an oblique vacuum deposition film with a thickness of 500 angstroms. The film thickness and the deposition rate were feedback controlled by use of a quartz oscillator thickness meter.

The glass substrate was thermally treated at 300° C. for one hour in a clean oven (DT62 of Yamato Science Co., Ltd.) in order to improve the alignment of the liquid crystal. Thus, two glass substrates were fabricated. A UV curing resin (Photorec of Sekisui Fine Chemical Co., Ltd.) dispersing spacers with a diameter of 1.4 $\mu m$ (true spheres: Catalyst Chemical Ind. Co., Ltd.) was provided between the two glass substrates so that the oblique vacuum deposition films were facing each other to make the directions of the oblique vacuum deposition anti-parallel. The resin was cured by irradiation with UV light to form an intended cell gap.

2) Dispersion of Fine Particles

In order to induce the development of fine domains capable of half tone, fine particles were dispersed in a ferroelectric liquid crystal as set out in Example 1. 100 mg of a ferroelectric liquid crystal, CS-1014, of Chisso Petrochemical Co., Ltd., which was heated to an isotropic phase temperature of 100° C. was mixed with 1 mg of carbon black, Mogul L, followed by agitation by means of a ultrasonic homogenizer. The ratio by weight of the fine particles was approximately 1%. The ferroelectric liquid crystal, CS-1014, of the isotropic phase in which the fine particles were dispersed was injected into the cell and was allowed to cool to room temperature.

3) Evaluation of Threshold Voltage Characteristics

The ferroelectric liquid crystal display device fabricated above was placed between crossed polarizing plates so that one of the memory states was coincident with the transmission axis of the polarizing plates to determine a transmitted light intensity, $T_{dark}$, after application of a rectangular wave (reset pulse with a pulse width of 1 msecond and a voltage of ±25 V and a transmitted light intensity, $T_{bright}$, after application of a rectangular wave (select pulse) with a pulse width of 1 msecond and a voltage of ±30 V or below. The contrast ratio, CR, was determined as follows: $CR=T_{bright}/T_{dark}$ By changing the voltage of the select pulse, the threshold value characteristic of the contrast ratio (i.e. a width of voltage of from the lowest contrast ratio (=1) to the highest contrast ratio) was measured. The results of the measurement are similar to those of FIG. 9 wherein the abscissa axis indicated a voltage of the select pulse and the ordinate axis indicates the contrast ratio in a memory state). With the ferroelectric liquid crystal display device using no fine particles, the width of the threshold value is so sharp as about 1 volt, whereas the width of the ferroelectric liquid display device using fine particles is increased to 10 V, enabling a half-tone display.

The observation through a polarization microscope reveals that the half-tone state of the ferroelectric liquid crystal display device using the fine particles consists of very fine multi-domains with a diameter in the order of $\mu m$ and is responsible for a half-tone display in one pixel of a high precision element with an size of approximately 100 $\mu m$ square. With a ferroelectric liquid crystal display device having a width of the threshold value of 10 V, the domains are very uniform. Irrespective of whether the fine particles are added or not, a high contrast ratio of not smaller than 40 is attained.

4) Analyses of Layer Structure

Using the X-ray diffraction method, the layer structure in the $SmC^x$ phase having the ferroelectric characteristic of the device fabricated above was analyzed. Taking the quantity of transmission of X-ray into consideration, 100 $\mu m$ thick glass substrates were used to make a ferroelectric liquid crystal display device used for the analyses. The rotating target X-ray source RU-300 of Rigaku Electric Co., Ltd., (target: Cu. K α ray 1.542 angstroms, 50 kV and 240 mA) were used.

Figure 14:
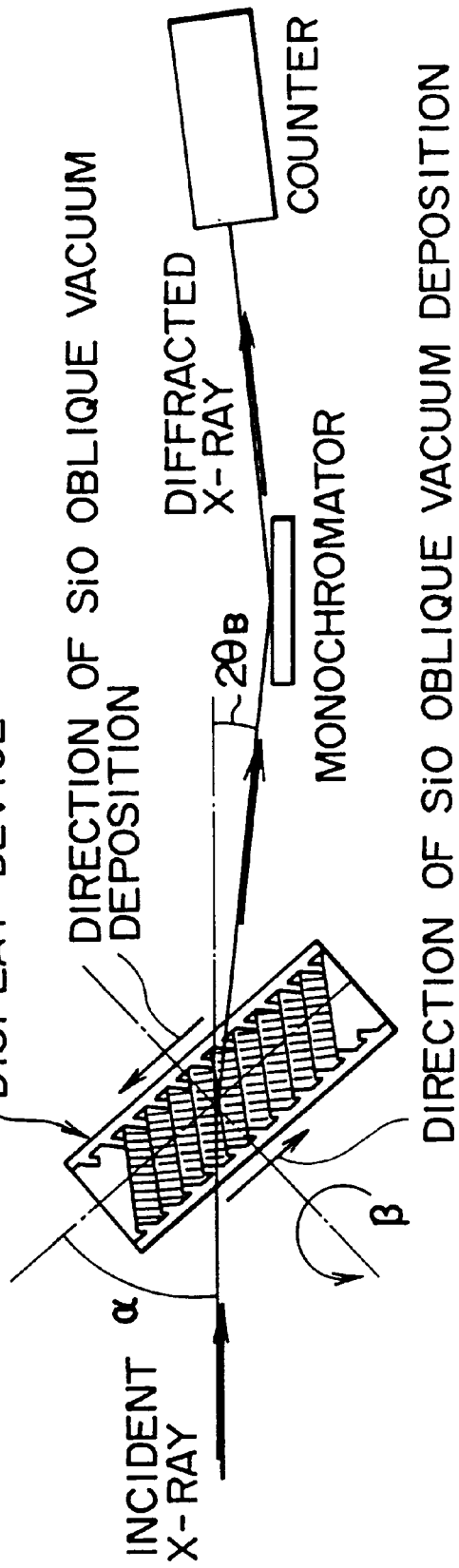
FIG. 14 is a schematic view illustrating measurement of X-ray diffraction of a liquid crystal display device.

As shown in FIG. 14, the incident X-ray which was converged to a beam diameter of 2.5 mm by means of a pinhole collimator was diffracted with a sample which was attached to a wide angle goniometer, CN2155D5, of Rigaku Electric Co., Ltd., used in combination with a fiber sample mount FS-3 of Rigaku Electric Co., Ltd., in such a way that the direction of the aligning treatment was held horizontal. After selecting a wavelength (i.e. CuK α ray of 1.542 angstroms in this case) by means of a monochromator fixed at a double angle ($2\theta_B=3.08°$ for CS-1014) of the Bragg angle $\theta_B$ inherent to the sample with respect to the incident X-ray wherein there was provided a slit between the sample and the monochromator of 1 mm square, counts per second were made by use of NaI Scintillation Counter SC-30 of Rigaku Electric Co., Ltd. A 2-inch slit was provided between the monochromator and the scintillation counter.

The angle of incidence, α, of the incident X-ray and the angle, β, of rotation within the plane of the sample could be, respectively, changed by means of the wide angle goniometer and the fiber sample mount. The angle, α, was determined as an origin when the face of the sample substrate was in parallel to the incident X-ray and was 90° when the incident X-ray was vertical to the face of the sample substrate. As viewed from the above, the angle was positive as turned in a clockwise manner. The angle, β, was taken as an origin when the direction of aligning treatment of the sample was horizontal and was positive in a clockwise fashion.

Figure 15A:
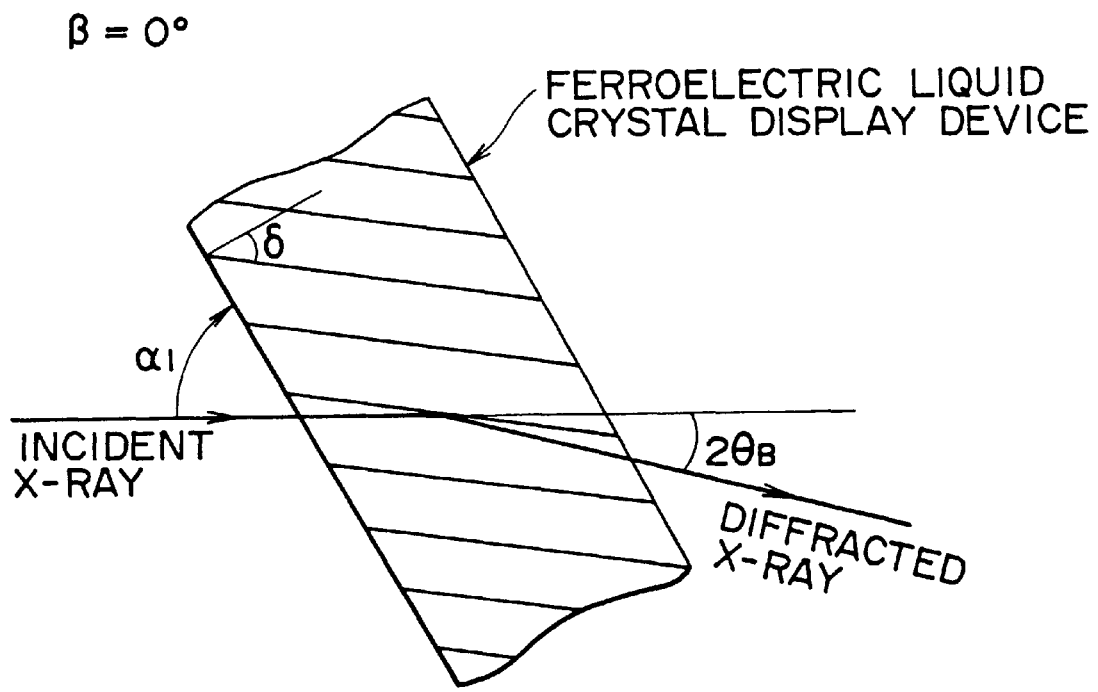
FIGS. 15A and 15B are, respectively, a schematic view illustrating a diffraction phenomenon for different incident angles of X-ray at the time of the measurement of X-ray diffraction.
Figure 15B:
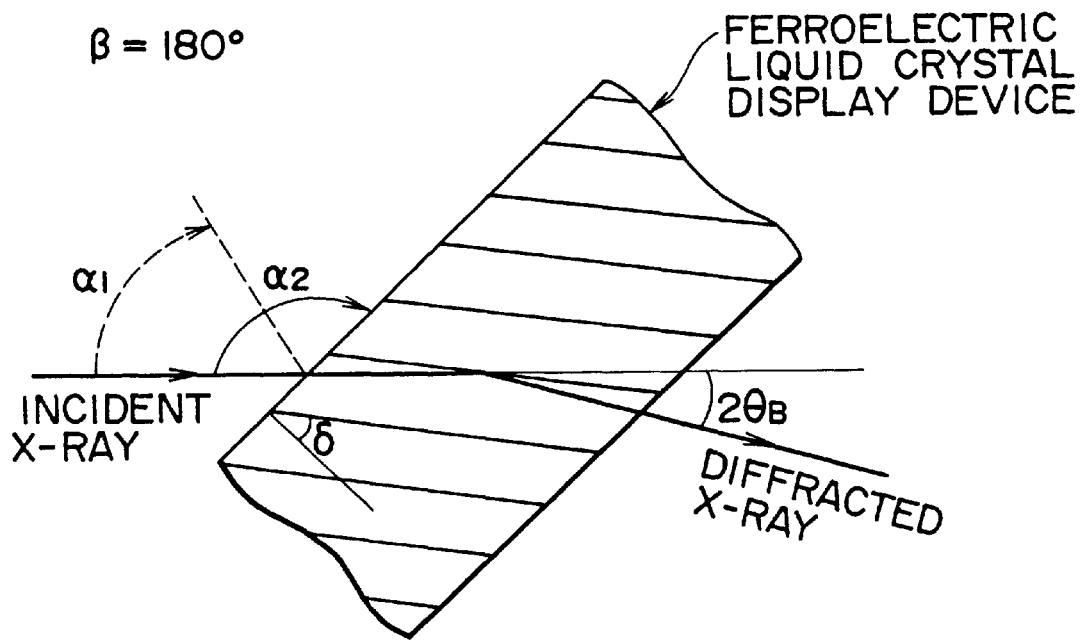

In the optic system set out above, the angle, δ, of the layer inclination relative to the normal of the substrate can be obtained from the following equation $$\delta=|\alpha_1-\alpha_2|/2$$

wherein where the angle, α, is scanned at β=0° and β=180°, the angle, α, at a maximum value of the X-ray diffraction intensity is taken as $\alpha_1$ and $\alpha_2$, respectively. This is particularly shown in FIGS. 15A and 15B. If the diffraction intensity peaks are plural in number, a similar calculation can be made on peaks which are in symmetrical position relative to α=90° for X-ray diffraction patterns of β=0° and β=180°. The above procedure for the measurement was performed since it was difficult to arrange the face of the sample substrate exactly vertical to the incident X-ray.

Figure 16A:
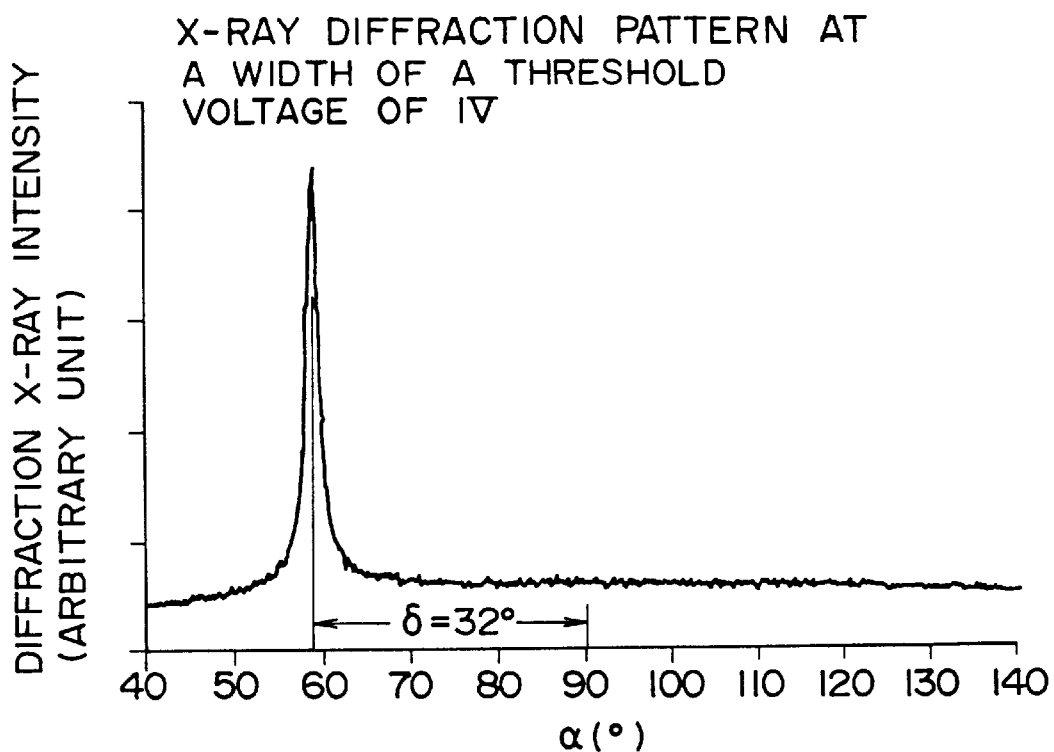
FIGS. 16A and 16B are, respectively, X-ray diffraction patterns wherein diffraction intensities obtained by measurement of X-ray diffraction are shown for comparison for different widths of threshold voltage.
Figure 16B:
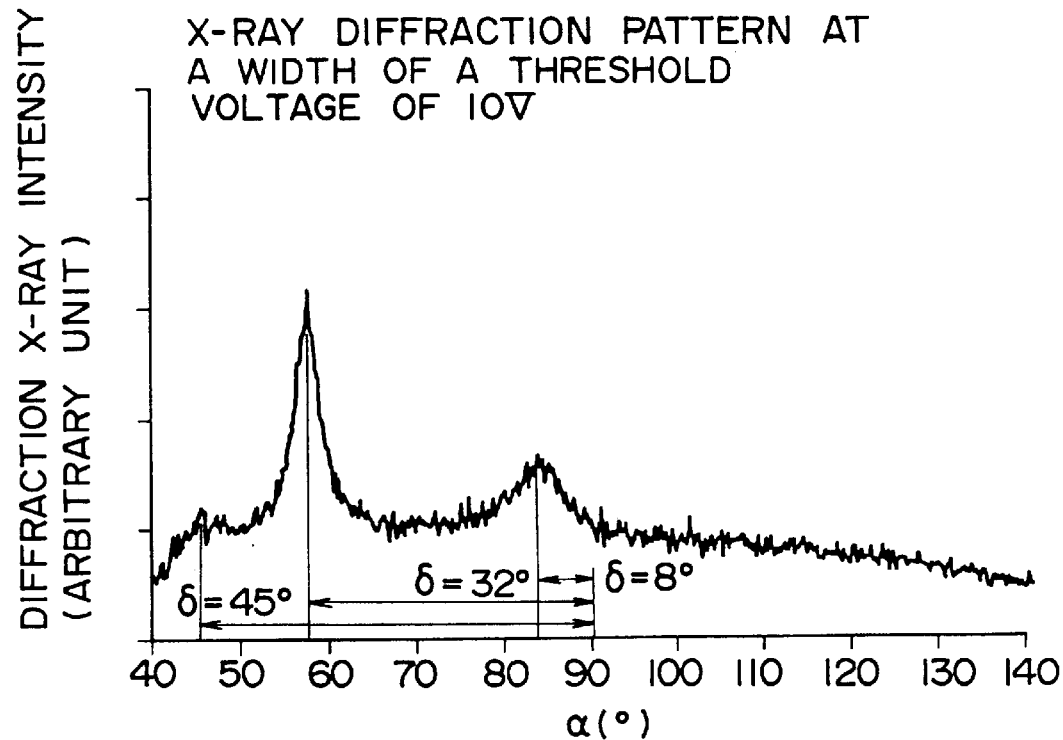

The results of the measurement of the diffraction X-ray intensity are shown in FIG. 16A for a ferroelectric liquid crystal display device whose threshold characteristic (threshold width) is 1 V and also in FIG. 16B for a threshold width of 10 V. In FIG. 16A, the diffraction intensity peak is only one (angle of layer inclination of 32°) which is very sharp with a peak half width of 2°. FIG. 16B reveals that there are three broad peaks with angles of layer inclination of 8°, 32° and 45° and half widths of 8°, 4° and 8° over a range of α of 90° to 135°.

Figure 17A:
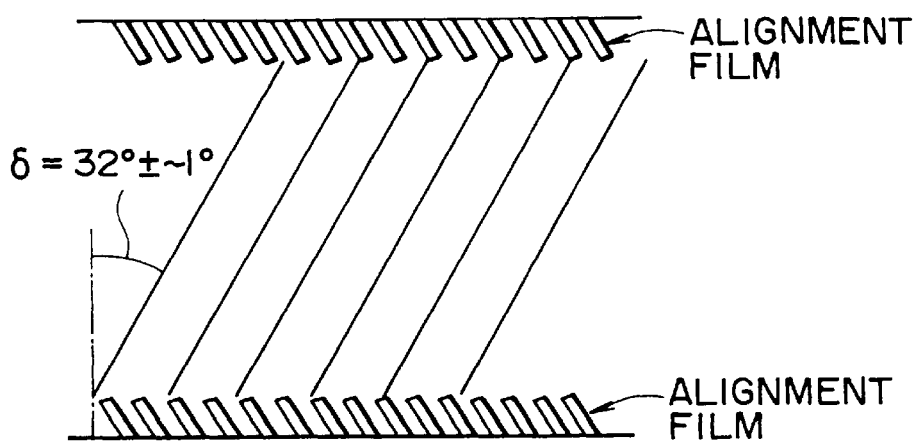
FIG. 17A and 17B are, respectively, schematic views showing angles of inclination of the liquid crystal layer for different widths of threshold voltage.
Figure 17B:
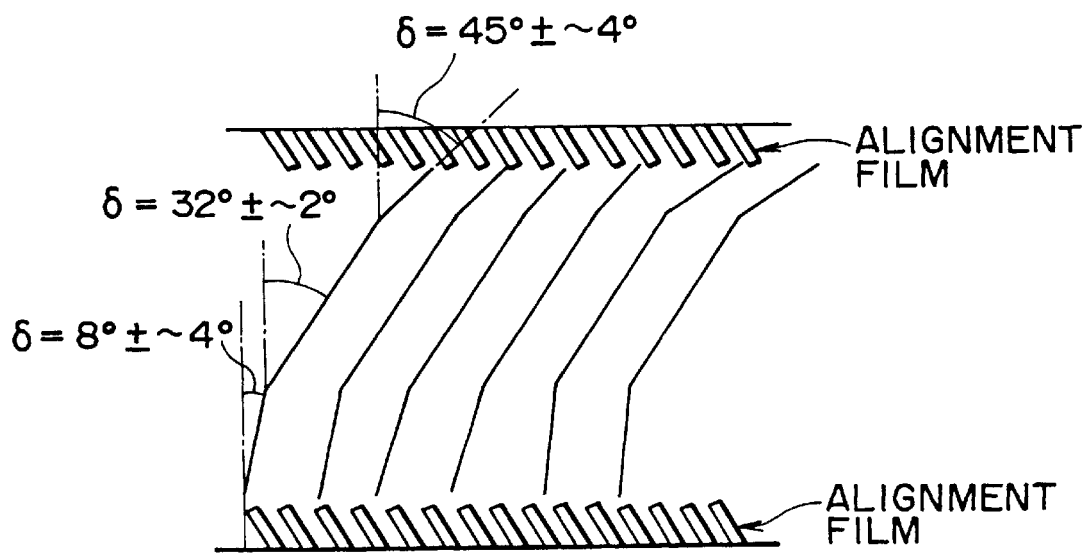

From the above measurements, the possible layer structures for threshold widths of 1 and 10 are considered as shown in FIGS. 17A and 17B, respectively. In the figures, the angle, δ, is the angle of the layer inclination with respect to the normal of the substrate determined from the X-ray diffraction method. The half of the half width (i.e. an extent of the layer inclination angle) of the X-ray diffraction peak is indicated as ±values after the value of δ.

Based on the difference in the layer structure, consideration is taken on the difference in the threshold width. With the case wherein the threshold width is 1 V, the X-ray diffraction peak is very sharp and the liquid crystal molecules, i.e. spontaneous polarization which is a switching source, are uniformly aligned. When an electric field of a certain magnitude is applied, most of the liquid crystal molecules are simultaneously switched. In contrast, with the case where the threshold width is 10 V, the layer structure has various angles of the layer inclination and the liquid crystal molecules, i.e. spontaneous polarization, are aligned to have a wide distribution. Accordingly, when an electric field is applied, some molecules are switched and some are not switched, thereby displaying a half-tone as a whole of the pixel. The half-tone display in one pixel is considered owing to the layer structure whose angle of the layer inclination is in a wide distribution. In the case, the angle of the layer inclination is changed in the vicinity of the alignment film and the angle of the layer inclination in other bulk portions is not changed.

EXAMPLE 7

In this example, how to drive the FLC display devices of the foregoing examples and comparative examples is described.

In order to confirm the effectiveness of a drive waveform, a voltage was applied to a single pixel liquid crystal cell to confirm the possibility of controlling the transmittance of the cell between the crosses polarizing plates.

The cell was fabricated in the following manner. Two glass substrates each having an ITO transparent electrode and a size of 40×20×3 mm were used to make a liquid crystal cell. The glass substrate was made of a standard or ordinary soda glass and the transparent electrode was coated by sputtering in a thickness of 500 angstroms. The resistance of ITO was 100 $\Omega/cm^2$.

An alignment film for aligning liquid crystal molecules was formed on each substrate by oblique vacuum deposition of SiO. The angle of the vacuum deposition was 85° and the alignment film had a thickness of 500 angstroms. Two types of liquid crystal cells were fabricated including one wherein the directions of the vacuum deposition of the alignment films were parallel to each other and the other wherein the directions of the vacuum deposition were anti-parallel to each other. The gap of the liquid crystal cell was controlled by mixing fine silica particles with a sealing material for bonding two glass substrates therewith. The size of silica particles was in the range of 1.4 to 2.0 μm.

CS-1014 of Chisso Petrochemical Co., Ltd., was used as a ferroelectric liquid crystal. The liquid crystal was degassed in an isotropic phase (110° C.) and injected into a gap of 1.5 μm between the glass substrates by utilizing the capillary action in the isotropic phase. After complete injection of the liquid crystal, the cell was gradually cooled down to room temperature. It took 2 to 3 hours before the cooling.

Ultrafine particles used were carbon fine particles as in Example 1, which was mixed with the ferroelectric liquid crystal. More particularly, the liquid crystal was heated to a temperature corresponding to an isotropic phase and mixed with carbon fine particles, followed by uniform mixing of the fine particles and the liquid crystal by a ultrasonic agitator. Then, the procedure of Example 1 was repeated to provide a liquid crystal cell.

Figure 19:
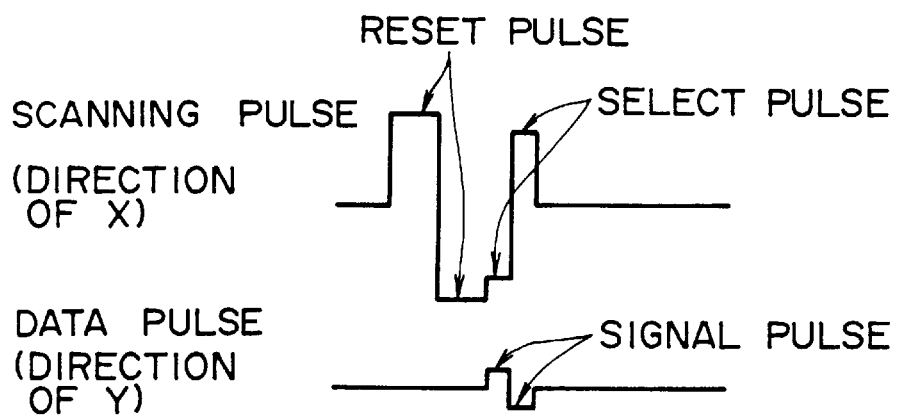
FIG. 19 is a view showing a scanning waveform and a signal waveform.

For gray-scale display, the ferroelectric liquid crystal cell was fabricating using transparent electrode-attached glass substrates 1*a* and 1*b* as shown in FIG. 18. The transparent electrodes were such that a group of N electrodes 2*b* which were parallel to the direction of X were formed on the substrate 1*b* and a group of M electrodes 2*a* which were parallel to the direction of Y were formed on the substrate 1*a*. In the figure, the alignment films were not shown. As shown in FIG. 19, electric signals for selecting display of a pixel was applied to the transparent electrodes in the direction of Y, and an electric signal for displaying the content of display information, or white or black or a half tone was applied to the transparent electrodes in the direction of X.

The waveform of the select electric signal applied to the direction of Y is as follows.

1. A select pulse consists of two pulses which are positively and negatively symmetric with each other. The voltage intensity and height of the pulse are determined according to the threshold value of the liquid crystal display device shown in FIG. 1. The pulse width is determined by the response time of the liquid crystal. The height of the pulse is a voltage at which the starlight texture appears in the monodomain of the liquid crystal displaying a black color, i.e. a threshold voltage $V_{thlow}$ of the $T_r$–V curve showing the relation between the variation in transmittance ($T_r$) of the liquid crystal cell established between the crossed polarizing plates and the applied voltage (V).

2. A symmetric reset pulse is set prior to the select pulse. The width of the reset pulse doubles the select pulse. The height is a voltage at which the liquid crystal is completely switched, i.e. $V_{thhigh}$ of the $T_r$–V curve+$\Delta V$. $\Delta V$ is a maximum signal voltage which is applied to the electrodes in the direction of X of the substrate 1b as will be described hereinafter.

The waveform of the electric signal for data which is applied to the direction of X is as follows.

1. The signal electric signal consists of two pulses which are positively and negatively symmetric with each other. The pulse width is equal to the width of select signal. The height, Vs, of the signal voltage is changed between 0 and $V_{yhhigh}$–$V_{thlow}$ according to the grey level of the liquid crystal to be displayed.

2. The polarity of the signal voltage pulse is so set that it is opposite to that of the select pulse. By this, the voltage which is applied to a pixel at (n, m) on the display is the sum of $V_s+V_{thlow}$ and is changed between $V_{thhigh}$ and $V_{thlow}$.

Figure 20:
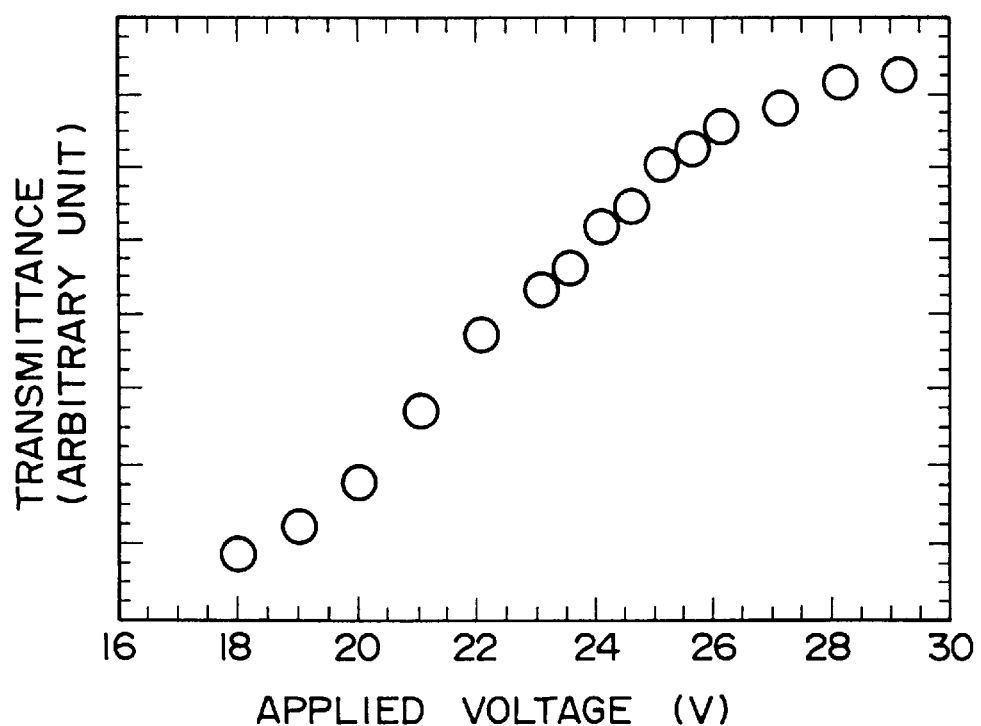
FIG. 20 is a graph showing the relation between the transmittance and the applied voltage of a liquid crystal display device of the invention.

FIG. 20 shows the variation of the transmittance of a liquid crystal cell to which the above voltage is applied. In the cell used for this, the SiO alignment films were arranged so that the directions of the vacuum deposition were parallel to each other. The cell gap was 1.6 μm when determined by a thickness meter MS-2000 of Ohtsuka Electronics Co., Ltd.). The cell made use of a liquid crystal to which 1.3 wt % of carbon fine particles Mogul L. The cell was placed between the crossed polarizing plates and its direction was so set that the transmittance of the cell became minimized in a memory state under which any voltage was applied.

The width of a signal pulse was set at 350 μs and a reset pulse width was set at 700 μs which was double the width of the signal pulse. The threshold voltage was 34 V for the cell, so that the reset voltage was determined at 35 V. The voltage for signals was changed between 18 and 30 V, thereby measuring a variation in transmittance of the cell. As will be apparent from FIG. 20, the transmittance of the cell is continuously changed within a rage of the applied voltage of from 18 V to 28 V. This reveals that the voltage control can control the transmittance of the cell.

EXAMPLE 8

Figure 21:
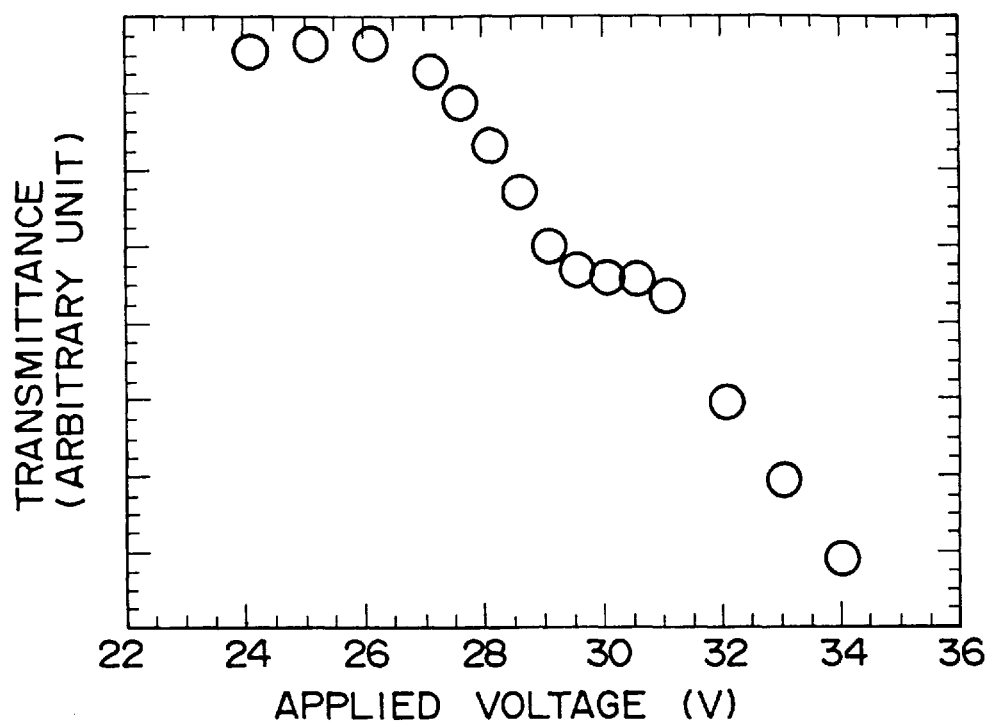
FIG. 21 is a graph showing the relation between the transmittance and the applied voltage of another type of liquid crystal display device of the invention.

FIG. 21 shows the relation between the transmittance and the applied voltage of a cell which was fabricated in the same manner as the cell set out with reference to FIG. 20 wherein the cell gap was 1.8 μm and the SiO alignment films were so arranged that the directions of the vacuum deposition were in anti-parallel to each other. The direction of the cell was set so that the transmittance of the cell became maximal when no electric field was applied.

The signal pulse width was set at 350 μs and the reset pulse width was 700 μs which was double the signal pulse width. The transmittance was measured at a signal voltage between 25 V and 30 V. From FIG. 21, it will be seen that the transmittance can be controlled by controlling the voltage as in the case of FIG. 20.

EXAMPLE 9

Based on the data of Examples 7 and 8, a cell using a ferroelectric liquid crystal mixed with carbon fine particles was subjected to matrix drive in a tone display.

Figure 22:
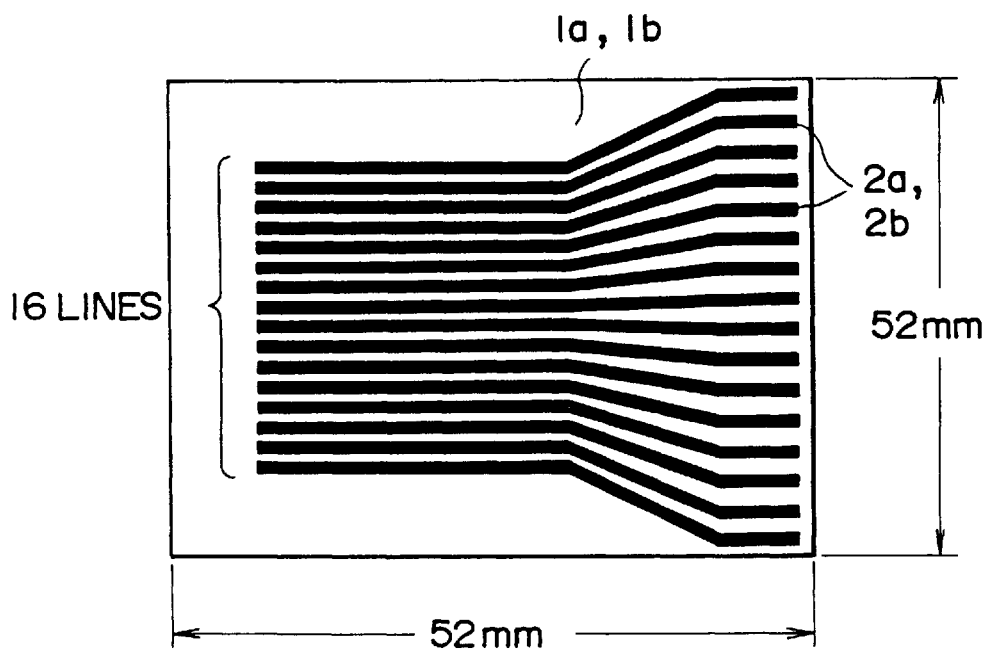
FIG. 22 is a schematic plan view showing an electrode arrangement of a liquid crystal display device of the invention.
Figure 23:
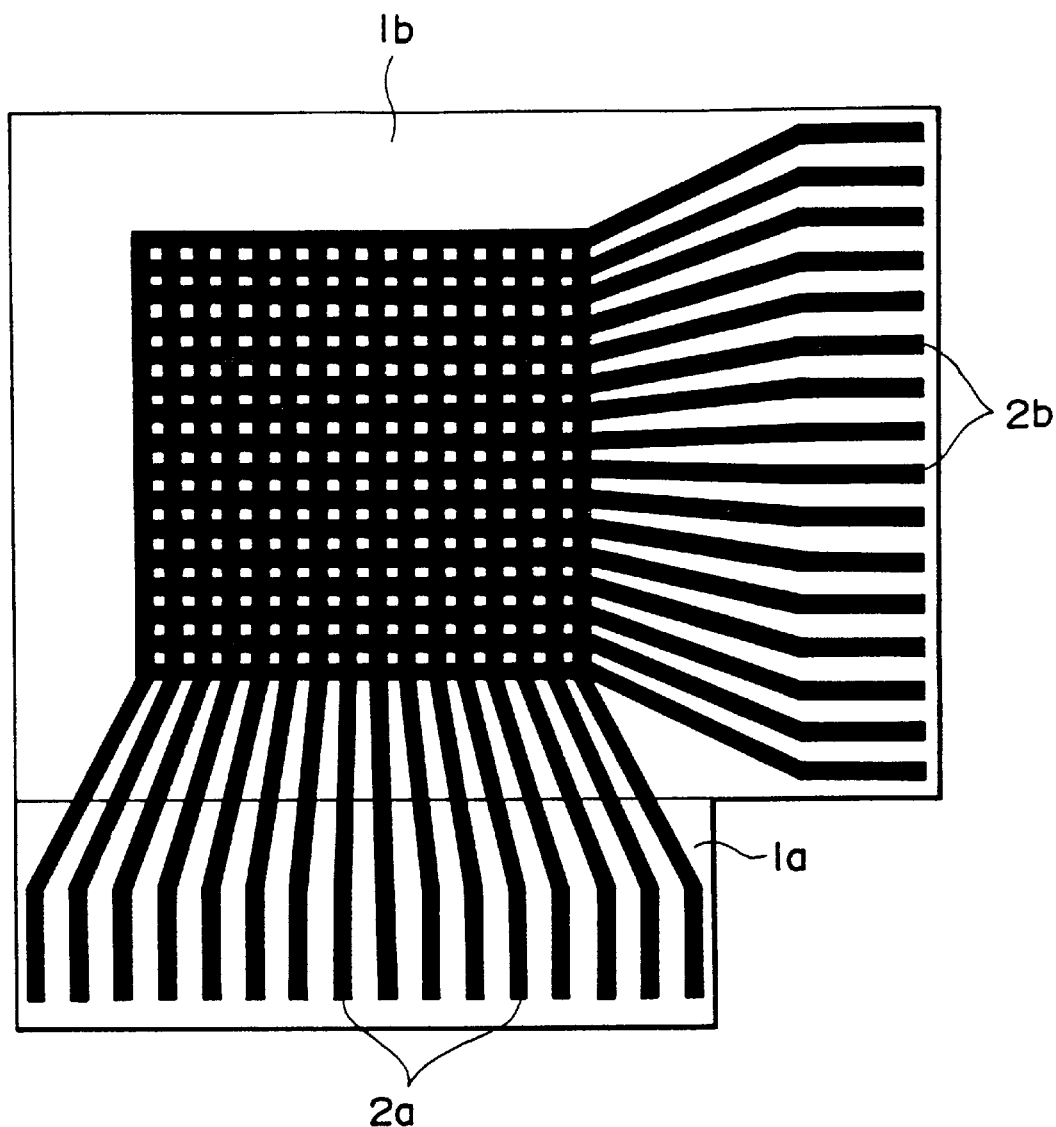
FIG. 23 is a schematic plan view of an electrode arrangement of a liquid crystal display device wherein two electrode units are intersected.

The cell was fabricated in the following manner. Glass substrates used were 7059 glass plates of Corning Glass Works having a size of 52×52×0.7 mm. The electrode was made of ITO and was formed by sputtering. The electrode pattern is shown in FIG. 22. The resistance of ITO was 100 $\Omega/cm^2$. The cell was fabricated using two glass substrates in such a way that the electrodes were crossed as shown in FIG. 23. The liquid crystal alignment film used as a SiO oblique vacuum deposition film formed on each substrate. The two substrates were so assembled that the directions of the vacuum deposition were in anti-parallel to each other. The cell gap was set at 1.5 μm. A liquid crystal was CS-1014 of Tisso Petrochemical Co., Ltd., to which 2 wt % of carbon fine particles, Mogul L, was added.

Figure 24:
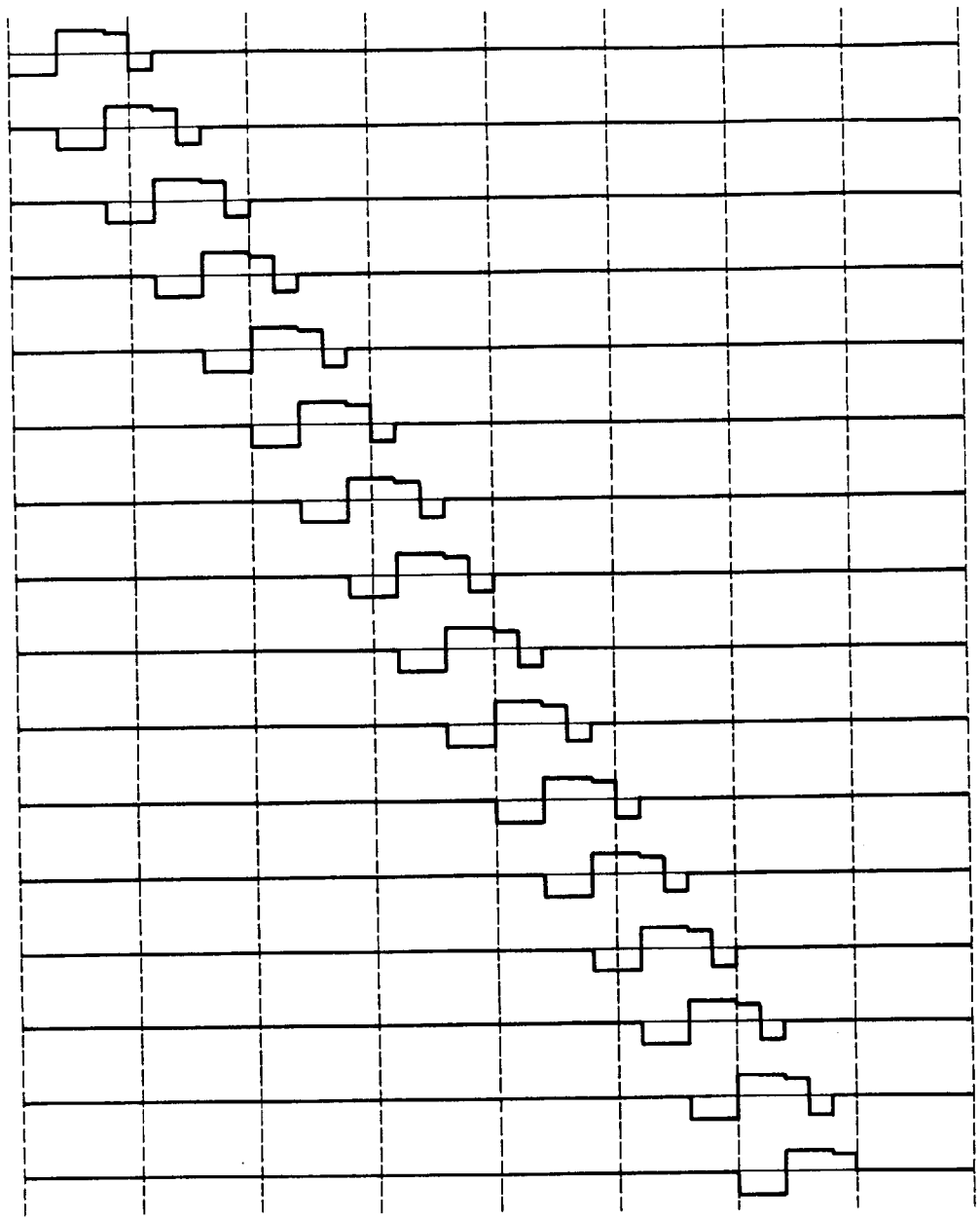
FIG. 24 is a view showing a practically employed scanning waveform.
Figure 25:
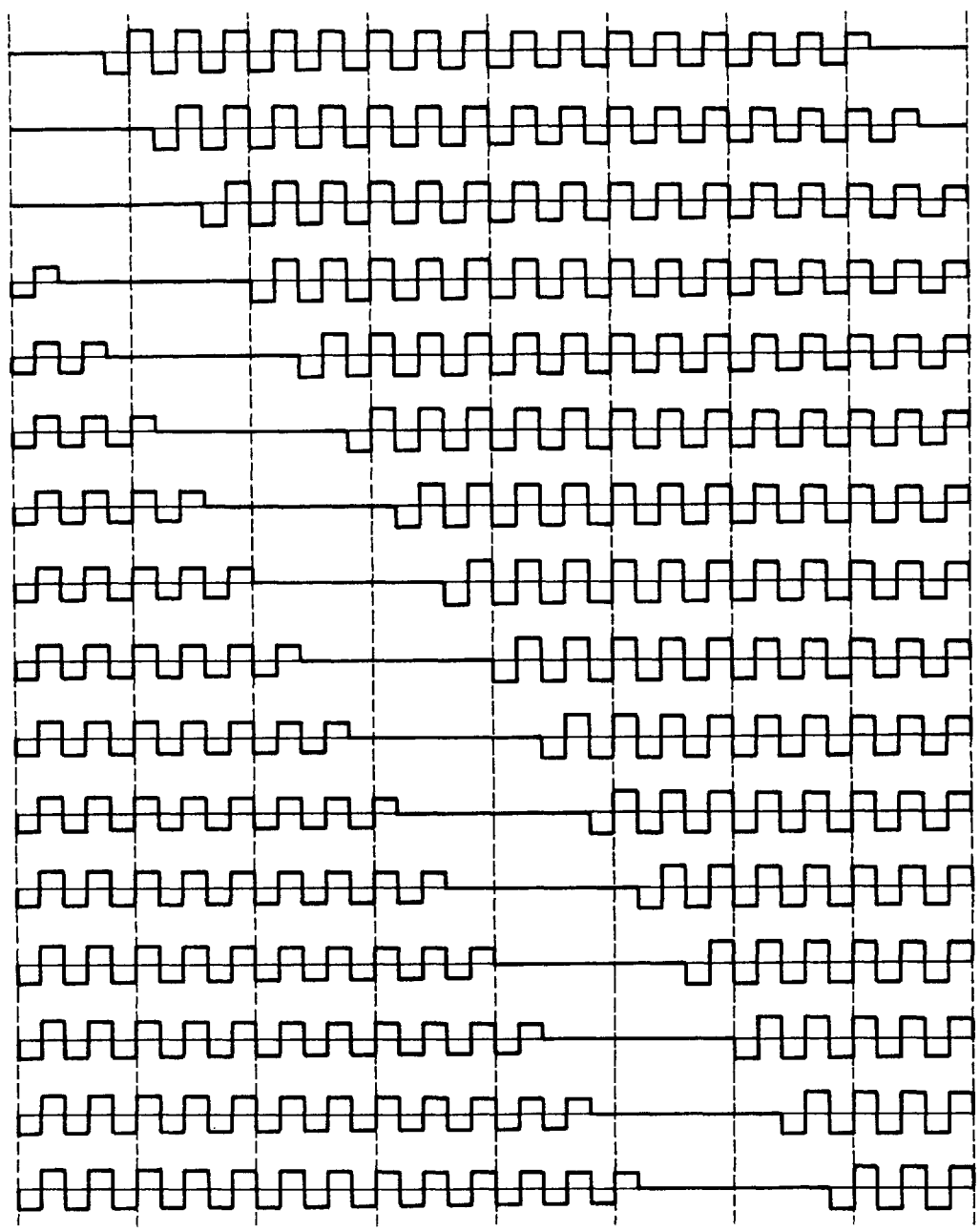
FIG. 25 is a view showing a practically employed signal waveform.

Voltage waveforms which are applied to the direction of X of the substrate 1b and to the direction of Y of the substrate 1a are shown in FIGS. 24 and 25, respectively.

The signal applied to the electrode toward the direction of Y was such that the reset voltage was set at 24 V and the select voltage at 20 V and that the signal pulse width was 400 μs and the reset pulse width was 800 μs which was double the signal pulse width. The voltage applied to the electrode toward the direction of X was such that the pulse width was 300 μs like the signal voltage and the strength of the voltage was changed between 10 V and 2.5 V.

Figure 26:
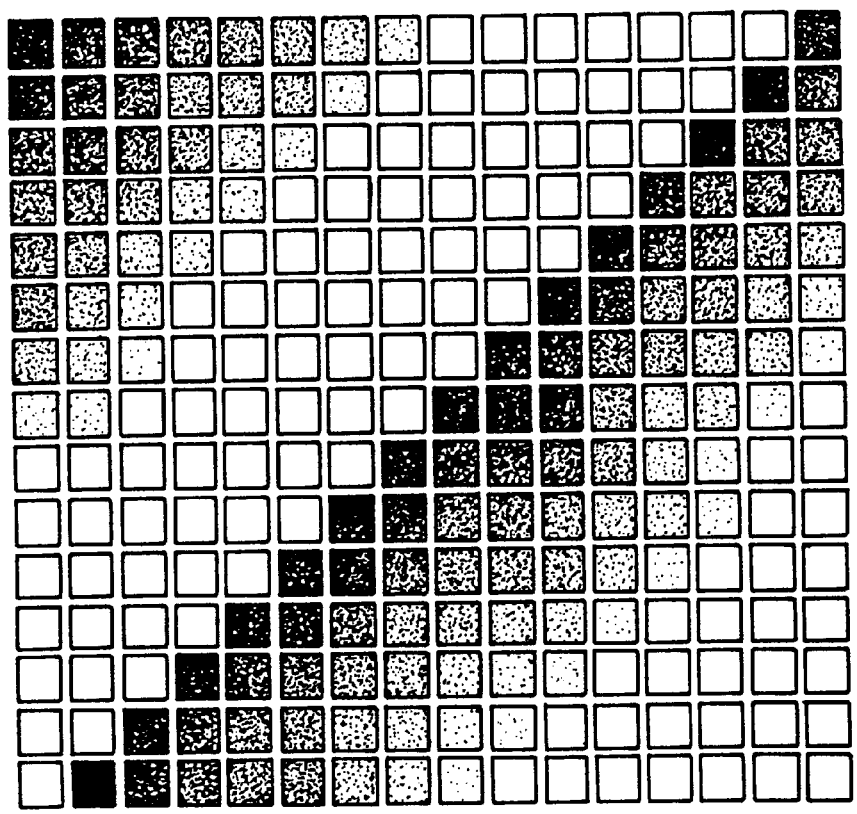
FIG. 26 is a view showing a display pattern obtained by the waveforms of FIGS. 24 and 25.

FIG. 26 shows a display pattern displayed according to the applied waveforms. From this, it will be seen that a good tone display is realized.

EXAMPLE 10

The general procedure of Example 1 was repeated except that a 300 angstroms thick tetrathiafulvalene-tetracyanoquinodimethane charge transfer complex film was formed on the SiO oblique vacuum deposition film of each substrate, followed by annealing at 100° C. for 1 hour and that fine particles added to the liquid crystal were those of MT Carbon (Colombia Carbon Co., Ltd.), thereby obtaining a liquid crystal display device.

The device was subjected to measurement of the relation between the applied voltage and the contrast ratio in the same manner as in Example 1, revealing that the analog tone property is improved over that of the device of Example 1.

In this example, it was confirmed that when the tetrathiafulvalentetracyanoquinodimethane complex (TTF-TCNQ) was formed on the oblique vacuum deposition film and then annealed at 100° C. for 1 hour, at least a part of the TTF-TCNQ might be, in some case, incorporated among rhombic columns as shown in FIG. 7B.

The liquid crystal display device had a reduced difference between the applied voltage and the effective voltage and exhibited a response speed which was higher by about two times than that of a liquid crystal display device using no TTF-TCNQ film.

EXAMPLE 11

The general procedure of Example 10 was repeated except that a 100 angstroms thick ytterbium diphthalocyanine thin film was formed on the SiO oblique vacuum deposition film and annealed at 150° C. for 1 hour, thereby obtaining a liquid crystal display device.

Figure 27:
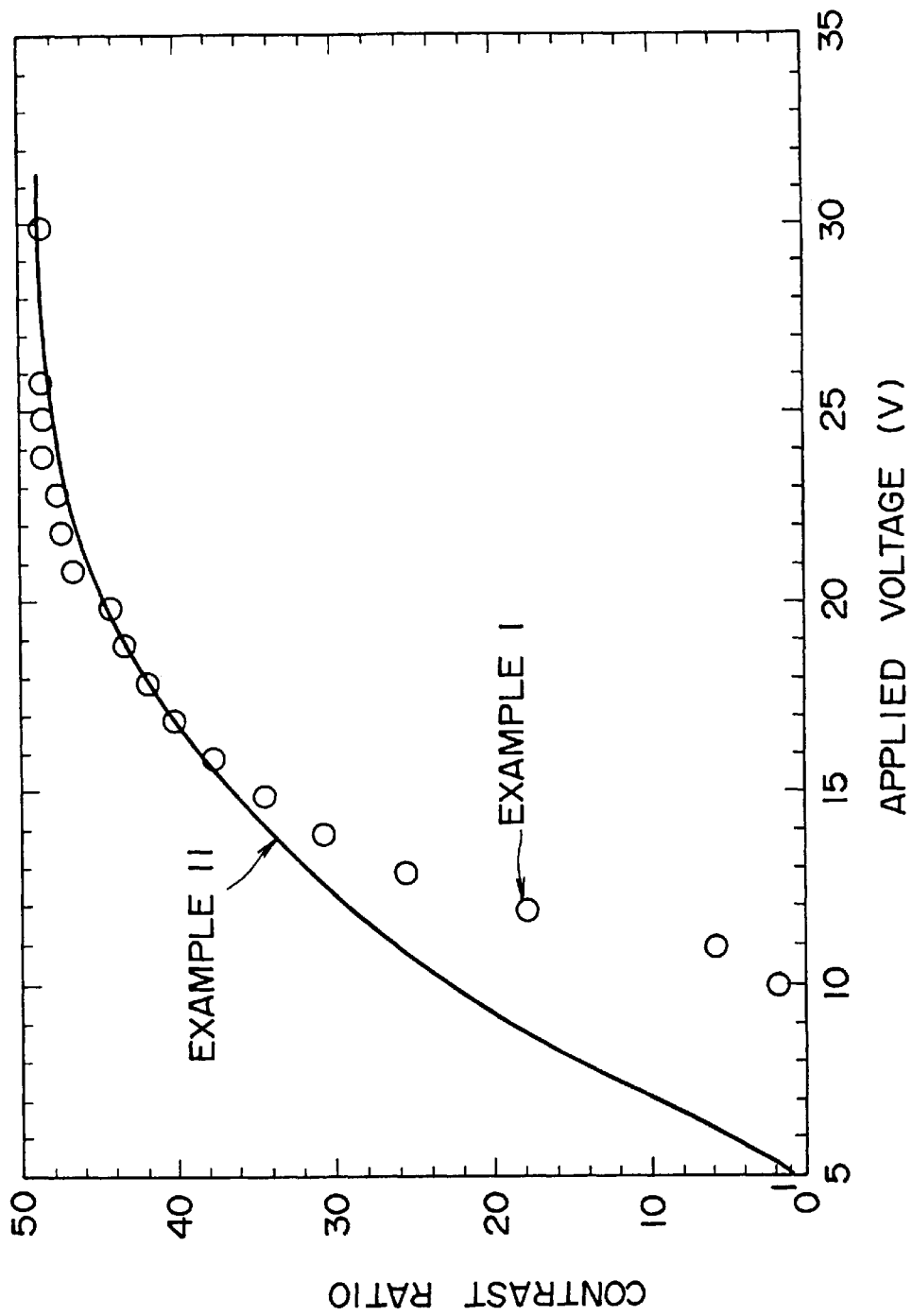
FIG. 27 is a graph showing the relation between the contrast ratio and the applied voltage of liquid crystal display devices of Examples 1 and 11.

The device was subjected to measurement of the relation between the applied voltage and the contrast ratio in the same manner as in Example 1. The results are shown in FIG. 27, revealing that the device of this example is improved in analog tone property especially in a low voltage range over the device of Example 1.

EXAMPLE 12

ITO-attached glass substrates fabricated in the same manner as in Example 1 were obliquely vacuum deposited with SiO, after which each glass substrate was held horizontal and formed with a vacuum deposition film of a tetrathiafulvalene-tetracyanoquinodimethane complex on the SiO film. The vacuum deposition was effected in the following manner. Tatrathiafulvalene (TTF) and tetracyanoquinodimethane (TCNQ) were placed in separate boats. Initially, in order to form a number of domains, TTF alone was formed on the SiO film in a thickness of about 10 angstroms at a substrate temperature of from room temperature to 120° C. at a pressure of $1 \times 10^{-6}$ to $5 \times 10^{-5}$ Torr., followed by co-deposition of TTF at a deposition rate of 1 to 3 angstroms/second and TCNQ at a deposition rate of 0.1 to 1 angstrom/second. Thereafter, TTF was further built up singly in a thickness of about 50 angstroms or over. After the formation of the film, the film was annealed at a temperature of 50 to 100° C. for 30 minutes to 2 hours in order to improve the aligning properties of liquid crystal molecules.

The resultant two glass substrates were assembled by use of a UV-curing adhesive (Photorec of Sekisui Fine Chemical Co., Ltd.) and polyethylene terephthalate spacers with a diameter of 9 μm in such a way that the directions of the deposition of the SiO films were in anti-parallel to each other. A nematic liquid crystal (ZLI-2008 of Merck) was injected into the cell gap to obtain a liquid crystal display device.

Figure 28:
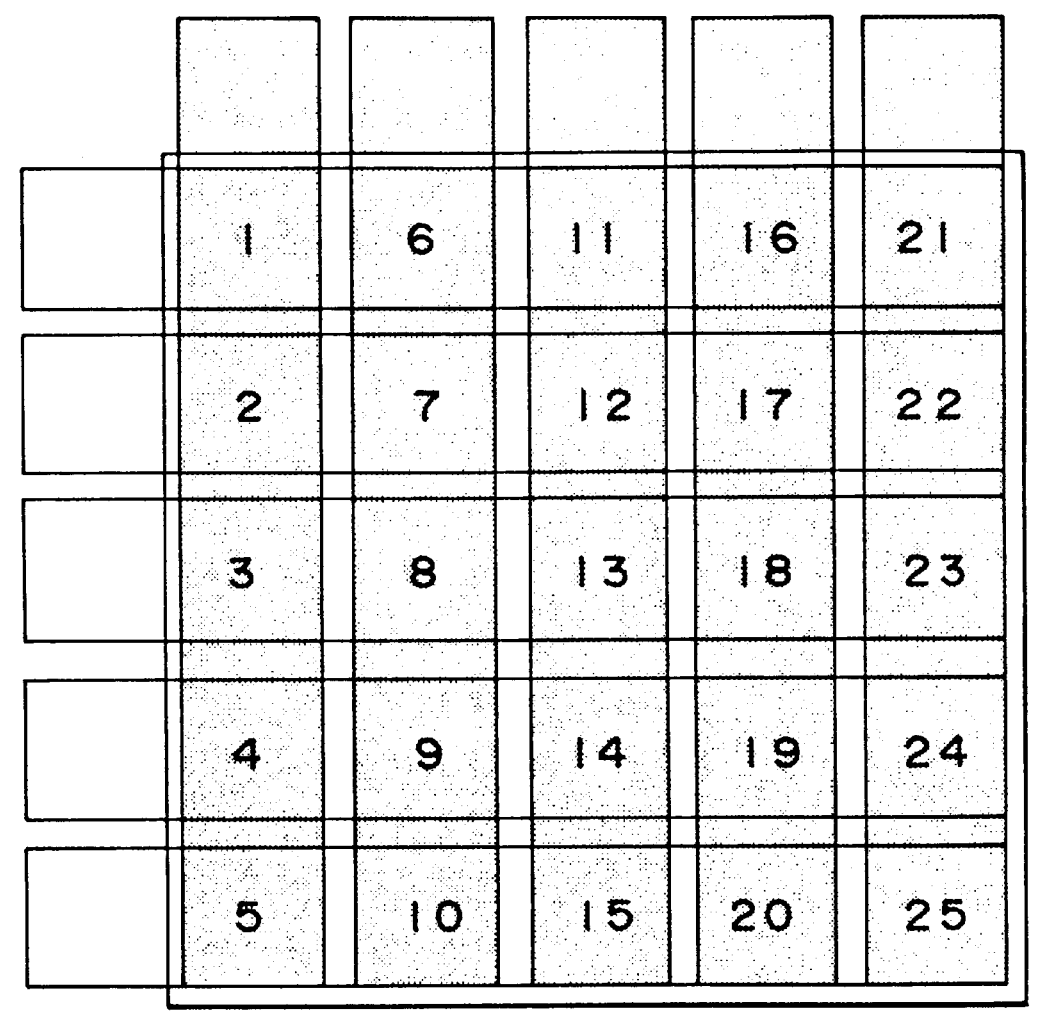

The device was subjected to measurement of a pretilt angle of the liquid crystal molecules according to a magnetic field capacitance method using a magnetic field intensity of 7.5 to 8.0 KGausses. In the case, one pixel with a size of 1.2×1.2 cm was divided into 25 domains with an area of about 2 mm² as shown in FIG. 28. The divided domains (Nos. 1 to 25) were, respectively, subjected to measurement of a pretilt angle. The results are shown in Table 8 and in FIG. 29A.

In this example, the annealing of the complex film might allow at least a part of the complex to be incorporated among the rhombic columns of the oblique vacuum deposition film. In the case, like the foregoing example, the response speed was confirmed to be improved.

COMPARATIVE EXAMPLE 3

The general procedure of Example 10 was repeated except that the tetrathiafulvalene-tetracyanoquinodimethane complex film was not formed and the electric field treatment was not performed, thereby obtaining a liquid crystal display device. The device was subjected to measurement of a pretilt angle of the liquid crystal molecules in the same manner as in Example 12. The results are shown in Table 8 and in FIG. 29B.

COMPARATIVE EXAMPLE 4

The general procedure of Example 10 was repeated except that for the formation of deposition film of the tetrathiafulvalene-tetracyanoquinodimethane complex, the complex which had been preliminarily prepared was placed in a boat and subjected to vacuum deposition at room temperature as a substrate temperature, a deposition rate of 5 angstroms/second and in a thickness of 100 angstroms and that any treatment in an electric field was not effected, thereby obtaining a liquid crystal display device. The device was subjected to measurement of a pretilt angle of liquid crystal molecules in the same manner as in Example 12. The results are shown in Table 8 and in FIG. 29B.

TABLE 8

| | Pretilt Angle (degree) | | |
|---|---|---|---|
| Pixel Domain No. | Example 12 | Comp. Ex. 3 | Comp. Ex. 4 |
| 1 | 23 | 33 | 24 |
| 2 | 20 | 34 | 26 |
| 3 | 27 | 32 | 27 |
| 4 | 27 | 33 | 24 |
| 5 | 22 | 35 | 25 |
| 6 | 24 | 33 | 24 |
| 7 | 24 | 33 | 24 |
| 8 | 25 | 33 | 27 |
| 9 | 25 | 33 | 25 |
| 10 | 24 | 34 | 24 |
| 11 | 26 | 34 | 25 |
| 12 | 23 | 33 | 27 |
| 13 | 24 | 33 | 25 |
| 14 | 23 | 35 | 25 |
| 15 | 28 | 33 | 26 |
| 16 | 24 | 33 | 25 |
| 17 | 21 | 34 | 25 |
| 18 | 23 | 34 | 24 |
| 19 | 25 | 33 | 27 |
| 20 | 24 | 35 | 26 |
| 21 | 23 | 32 | 25 |
| 22 | 24 | 34 | 27 |
| 23 | 22 | 33 | 24 |
| 24 | 26 | 33 | 25 |
| 25 | 25 | 32 | 26 |

Figure 29A:
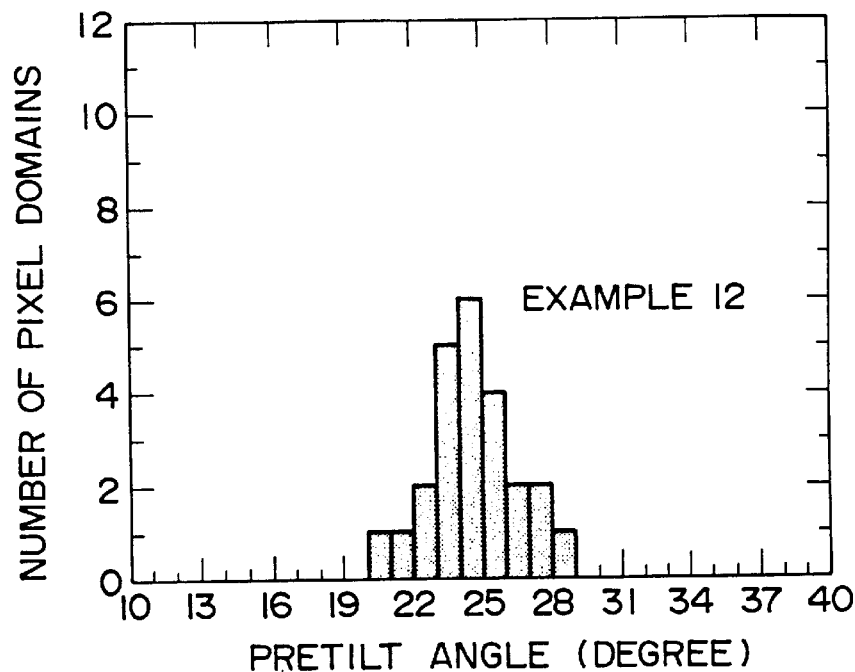
FIGS. 29A and 29B are, respectively, a graph showing the relation between the number of pixel domains and the pretilt angle of different liquid crystal molecules.

As will be apparent from Table 8 and FIG. 29A, the liquid crystal display device of Example 12 has a distribution width of the pretilt angle of the liquid crystal molecules of 9°. Accordingly, the contrast ratio is gently increased or decreased depending on the applied electric field intensity within a certain range, thereby enabling the analog tone display.

Figure 29B:
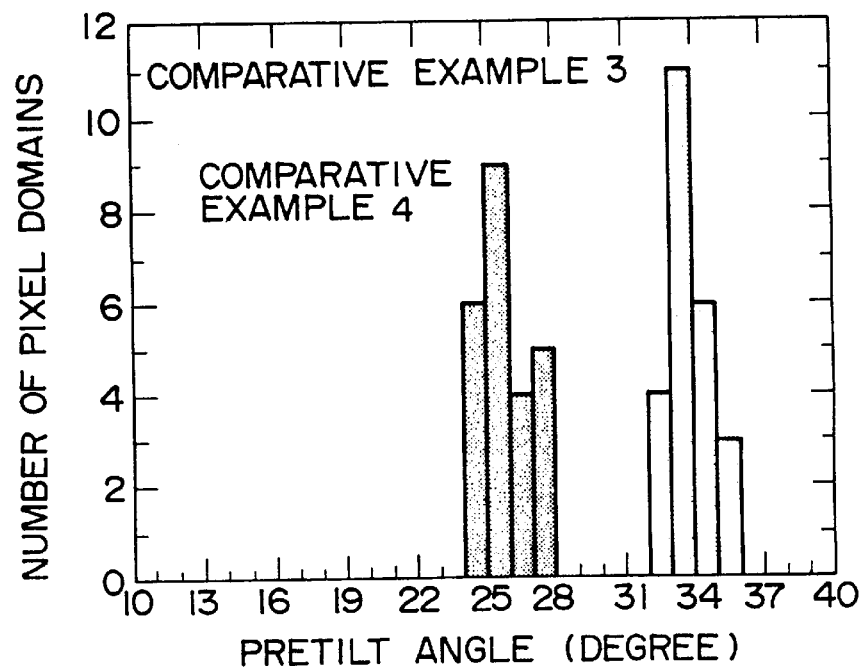

In contrast, as will be apparent from Table 8 and FIG. 29B, the liquid crystal display devices of Comparative Examples 3 and 4 have, respectively, a distribution width of the pretilt angle as small as 4°, thus the analog tone display being inferior to that of Example 12.

It will be noted that when the procedure of Comparative Example 4 is repeated except that tetrathiafulvalene and tetracyanoquinodimethane were subjected to co-deposition from the first. The resultant device gave similar results as in Comparative Example 4.

EXAMPLE 13

The general procedure of Example 12 was repeated except that spacers with a diameter of 1.4 μm (true spheres of Catalyst Chemical Co., Ltd.) were used, thereby obtaining a liquid crystal cell. A ferroelectric liquid crystal (CS-1014 of, Chisso Petrochemical Co., Ltd.) was injected into the cell. The cell was subjected to an electric field treatment by application of a frequency of 100 Hz and a rectangular wave of ±30 V for one minute to obtain a liquid crystal display device.

The device was subjected to measurement of the relation between the applied electric field intensity and the contrast ratio in the following manner. The device was applied with a bias voltage of ±6 V twenty times and then applied with a $V_{reset}$ pulse of ±30 V with a pulse width of 500 μseconds, as shown in FIG. 8, under crossed Nicols. Thereafter, a$V_{gray}$ pulse not larger than ±30 V (with a pulse width of 500 μseconds) was applied. The contrast ratio was calculated from the the light transmission intensity after the application of the $V_{reset}$ pulse and the light transmission intensity after the application of the $V_{gray}$ pulse. The results are shown in Table 9 and in FIG. 30A.

COMPARATIVE EXAMPLE 5

The general procedure of Example 13 was repeated except that the tetrathiafulvalene-tetracyanoquinodimethane complex film was not formed and the electric field treatment was not effected, thereby obtaining a liquid crystal display device. The device was subjected to determination of the relation between the applied electric field intensity and the contrast ratio in the same manner as in Example 13. The results are shown in Table 9 and in FIG. 30B.

Moreover, the general procedure of Example 13 was repeated except that for the formation of deposition film of the tetrathiafulvalene-tetracyanoquinodimethane complex, the complex which had been preliminarily prepared was placed in a boat and subjected to vacuum deposition at room temperature as a substrate temperature, a deposition rate of 5 angstroms/second and in a thickness of 100 angstroms and that any treatment in an electric field was not effected, thereby obtaining a liquid crystal display device. The device was subjected to measurement of the relation between the applied electric field and the contrast ratio. The results are shown in Table 9 and in FIG. 30C.

TABLE 9

| Electric Field Intensity (V/μm) | Example 13 | Comp. Ex. 5 | Comp. Ex. 6 |
|---|---|---|---|
| 7.7 | 1.5 | 1.0 | 1.0 |
| 8.2 | 4.1 | 1.0 | 1.0 |
| 8.8 | 7.1 | 1.1 | 1.0 |
| 9.4 | 14.0 | 1.0 | 0.9 |
| 10.0 | 28.4 | 1.0 | 1.0 |
| 10.6 | 40.4 | 45.0 | 12.3 |
| 11.2 | 49.3 | 50.2 | 12.5 |
| 11.8 | 47.8 | 50.2 | 12.6 |
| 12.4 | 56.7 | 50.4 | 12.5 |
| 12.9 | 62.0 | 50.4 | 12.3 |
| 13.5 | 54.0 | 51.0 | 12.5 |
| 14.1 | 52.1 | 50.1 | 12.6 |
| 16.5 | 50.9 | 50.3 | 12.6 |

Figure 30A:
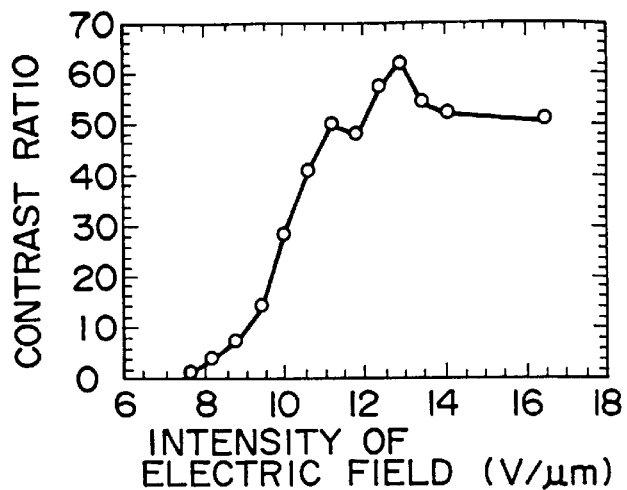
FIGS. 30A, 30B and 30C are, respectively, the relation between the contrast ratio and the intensity of an applied electric field for different liquid crystal display devices of the invention.

As will be apparent from Table 9 and FIG. 30A, the device of Example 13 exhibits a gentle increase or decrease of the contrast in response to the change of the electric field within a certain range. Accordingly, the device of Example 13 is able to display an analog tone.

Figure 30B:
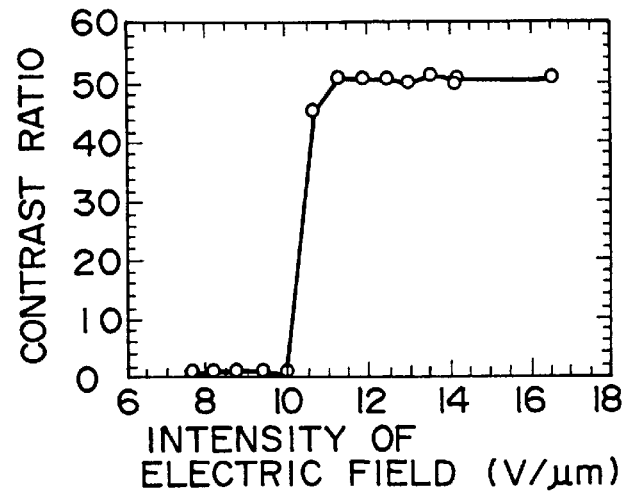
Figure 30C:
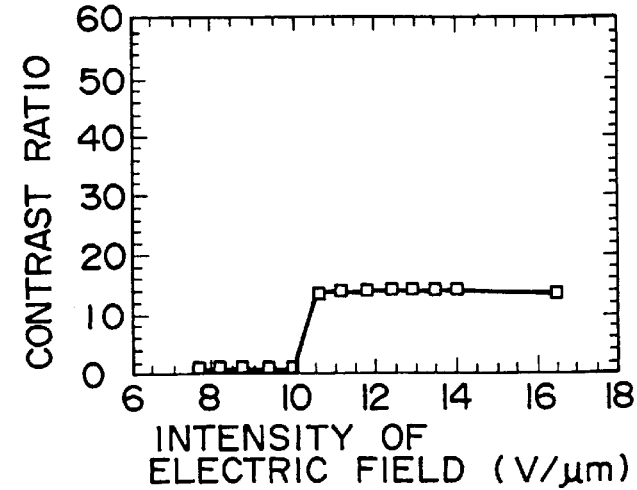

In contrast, the results of Table 9 and FIGS. 30B and 30C reveal that the devices of Comparative Examples 5 and 6 have, respectively, a sharp curve of the threshold value and have thus no analog tone property.

EXAMPLE 14

The general procedure of Example 13 was repeated except that a ytterbium diphthalocyanine thin film was used instead of the tetrathiafulvalene-tetracyanoquinodimethane complex film and the film was not subjected to the electric field treatment, thereby obtaining a liquid crystal display device. The device was subjected to determination of the relation between the applied electric field intensity and the contrast ratio. The results are shown in Table 10 and in FIG. 31A.

COMPARATIVE EXAMPLE 7

The general procedure of Example 14 was repeated except that no ytterbium diphthalocyanine thin film was formed and no electric field treatment was carried out, thereby obtaining a liquid crystal display device. The device was subjected to determination of the relation between the applied electric field intensity and the contrast ratio. The results are shown in Table 10 and in FIG. 31B.

TABLE 10

| Electric Field Intensity (V/μm) | Example 14 | Comp. Ex. 7 |
|---|---|---|
| 2.5 | 1.0 | 1.0 |
| 3.8 | 1.1 | 1.1 |
| 5.0 | 1.8 | 1.1 |
| 5.6 | 3.0 | 1.0 |
| 6.3 | 4.7 | 1.1 |
| 6.9 | 7.4 | 1.1 |
| 7.5 | 13.2 | 1.0 |
| 8.1 | 18.8 | 1.0 |
| 8.8 | 20.2 | 1.1 |
| 9.4 | 21.7 | 1.0 |
| 10.0 | 22.1 | 1.0 |
| 10.6 | 23.6 | 45.0 |
| 11.3 | 23.8 | 50.2 |
| 11.9 | 25.4 | 50.2 |
| 12.5 | 23.1 | 50.4 |
| 15.0 | 25.3 | 50.0 |
| 17.5 | 25.9 | 51.0 |
| 20.0 | 27.6 | 50.3 |

Figure 31A:
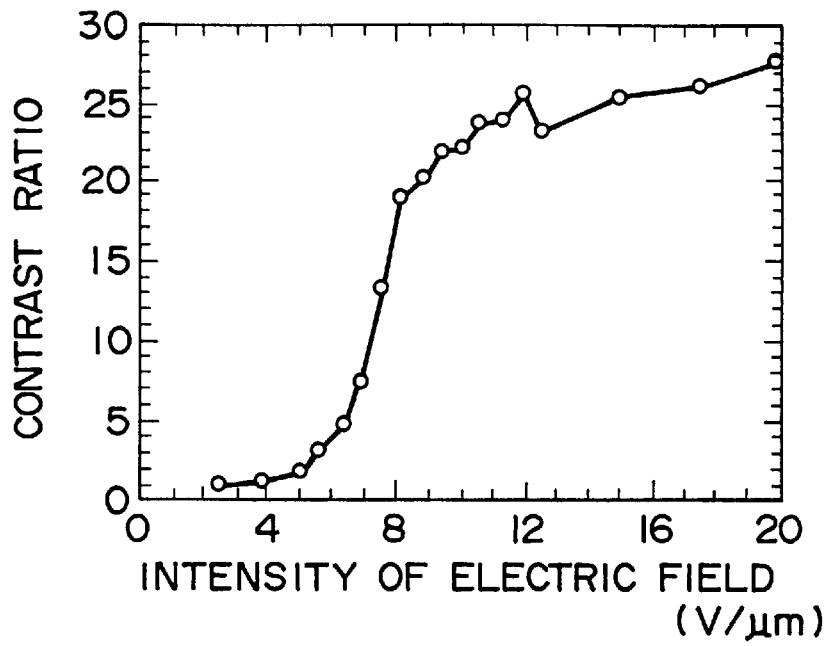
FIGS. 31A and 31B are, respectively, a graph showing the relation between the contrast ratio and the intensity of an applied electric field of liquid crystal display devices of the invention.

As will be apparent from Table 10 and FIG. 31A, the device of Example 14 is gently increased or decreased in the contrast ratio depending on the electric field intensity within a certain range. Accordingly, the device of Example 14 was able to display analog tone.

Figure 31B:
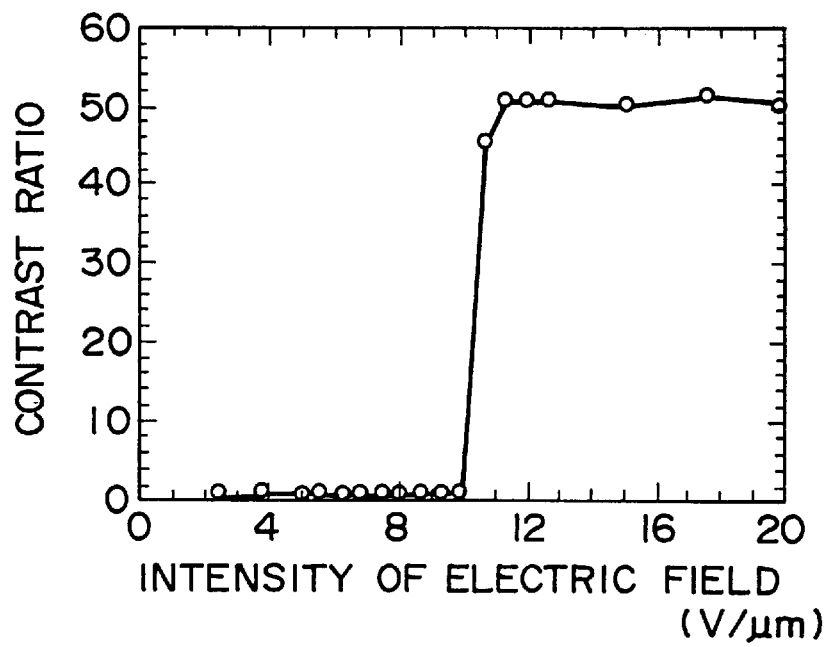

In contrast, the results of Table 10 and FIG. 31B reveal that the device of Comparative Example 7 has a threshold value which is in a sharp curve and does not have any analog tone property.

EXAMPLE 15

After oblique vacuum deposition of SiO on ITO-attached glass substrates fabricated in the same manner as in Example 1, each glass substrate was kept horizontal, on which a 20 angstroms thick SiO vertical vacuum deposition film was formed on the oblique deposition SiO film under the same conditions as for the oblique vacuum deposition film. After the film formation, the film was annealed in air at 300° C.

Two glass substrates obtained above were assembled by use of spacers with a diameter of 1.4 μm (true spheres of Catalyst Chemical Co.,Ltd.) and a UV curing adhesive (Photorec of Sekisui Fine Chemical Co., Ltd.) in such a way that the SiO vertical vacuum deposition films of the substrates were facing each other and the directions of the vacuum deposition of the SiO oblique vacuum deposition films were in anti-parallel to each other. A ferroelectric liquid crystal (CS-1014 of Chisso Co., Ltd.) was injected into the resultant cell gap to obtain a liquid crystal display device. The liquid crystal of the device was formed with microdomains with a diameter of about 10 μm.

Figure 32:
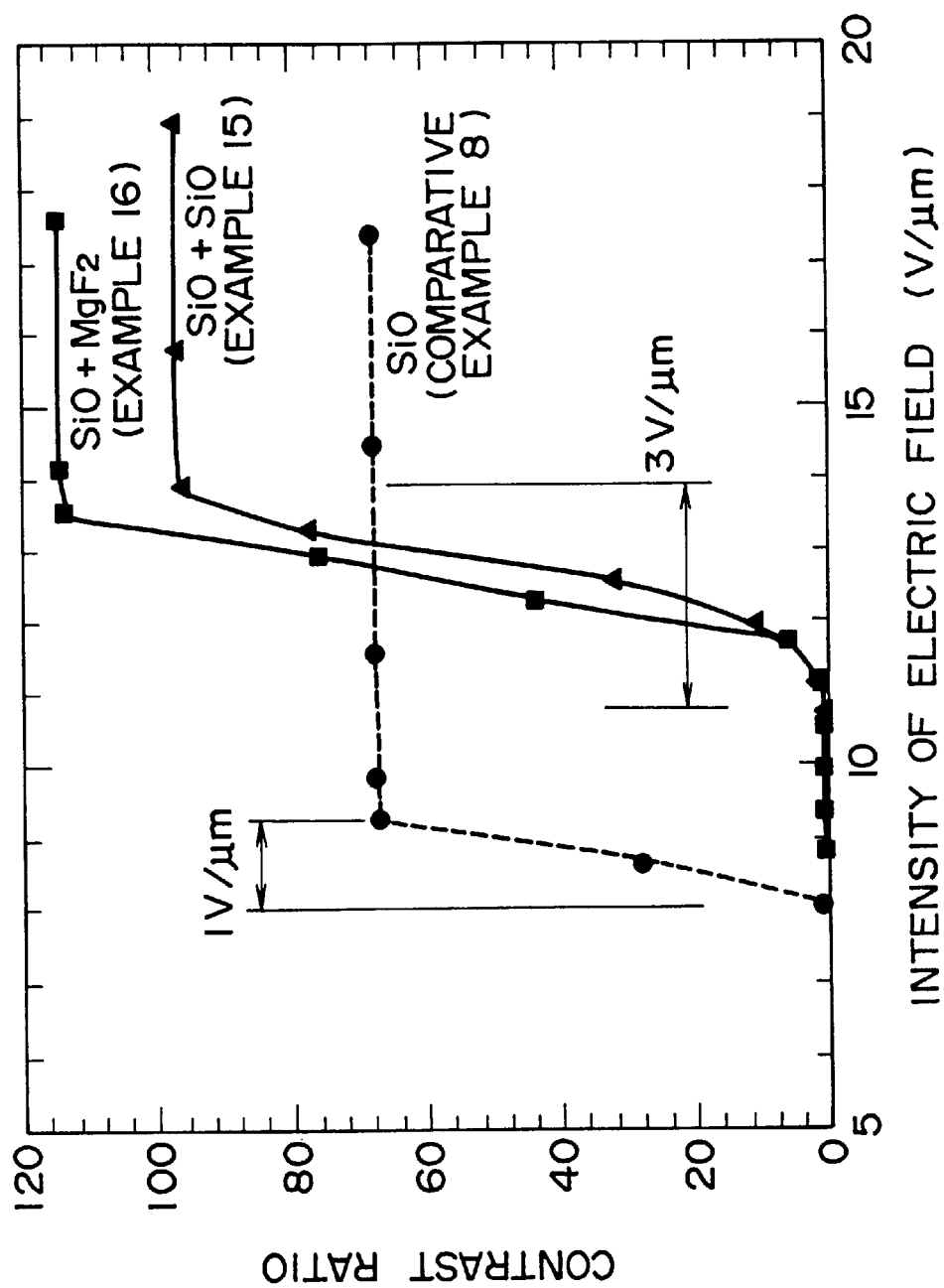
FIG. 32 is a graph showing the relation between the contrast ratio and the intensity of an applied electric field for different liquid crystal display devices of the invention and for comparison.

The device was applied with a rectangular wave of ±30 V at a frequency of 20 Hz and then subjected to measurement of the relation between the applied electric field intensity and the contrast ratio in the same manner as in Example 13. The results are shown in FIG. 32.

EXAMPLE 16

The general procedure of Example 15 was repeated except that a $MgF_2$ deposition film was used instead of the SiO vertical deposition film, thereby obtaining a liquid crystal display device. The device was subjected to determination of the relation between the applied electric field intensity and the contrast ratio in the same manner as in Example 15. The results are also shown in FIG. 32.

COMPARATIVE EXAMPLE 8

The general procedure of Example 15 was repeated except that the SiO vertical vacuum deposition film was not formed, thereby obtaining a liquid crystal display device. The device was subjected to determination of the relation between the applied voltage and the contrast ratio. The results are shown in FIG. 32.

As will be apparent from FIG. 32, the devices of Examples 15, 16 have a width of the threshold voltage as great as 3 V/$\mu$m and the contrast ratio is gently increased or decreased depending on the electric field intensity within a certain range. Accordingly, the devices of Examples 15, 16 enable an analog tone display.

In contrast, as will be apparent from FIG. 32, the device of Comparative Example 8 has a threshold voltage width as small as approximately 1 V/$\mu$m. Thus, the device does not have any analog tone property.

EXAMPLE 17

After formation of the SiO oblique vacuum deposition film on the ITO-attached glass substrate fabricated in the same manner as in Example 1, a 40 angstroms thick Ag vertical deposition film was formed on the SiO oblique deposition film by an electron beam method. The method was carried out under conditions of a substrate temperature of room temperature, a degree of vacuum of $9 \times 10^{-6}$ Torr., and a deposition rate of 1 angstrom/second.

The two glass substrates were obtained in this manner and assembled by use of spacers with a diameter of 1.4 $\mu$m (true spheres of Catalyst Chemical Co., Ltd.) and a UV curing adhesive (Photorec of Sekisui Fine Chemical Co., Ltd.) in such a way that the Ag vertical films were facing each other and the directions of the vacuum deposition of the SiO oblique deposition films were in anti-parallel to each other, thereby obtaining a liquid crystal cell. A ferroelectric liquid crystal (CS-1014 of Chisso Co. Ltd.) was injected into the cell gap to obtain a liquid crystal display device.

The device was applied with a rectangular wave of ±30 V at a frequency of 20 Hz for one minute, after which it was subjected to determination of the relation between the applied electric field intensity and the contrast ratio in the same manner as in Example 15. The results are shown in FIG. 33.

COMPARATIVE EXAMPLE 9

The general procedure of Example 17 was repeated except that the Ag vertical deposition film was not formed, thereby obtaining a liquid crystal display device. The relation between the applied electric field intensity and the contrast ratio was determined. The results are shown in FIG. 33.

Figure 33:
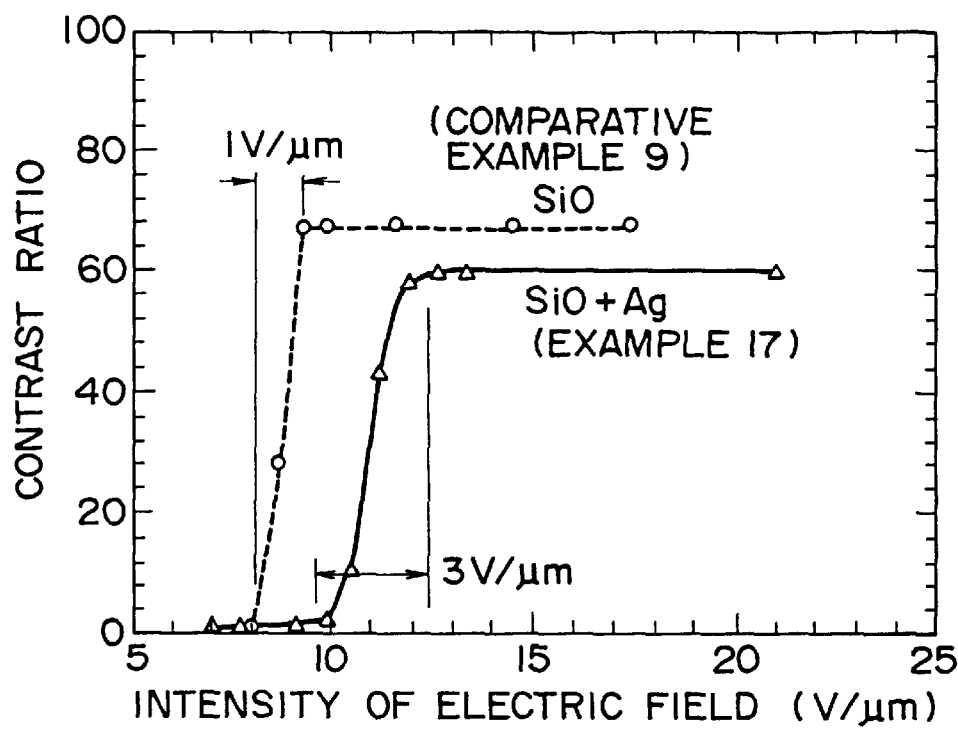
FIG. 33 is a graph showing the relation between the contrast ratio and the intensity of an applied electric field for different liquid crystal display devices of the invention and for comparison.

As will be apparent from FIG. 33, the device of Example 17 has a threshold value width as great as approximately 3 V/$\mu$m and the contrast ratio is gently increased or decreased depending on the electric field intensity within a certain range. Thus, the device has an analog tone property. In contrast, as will be apparent from FIG. 33, the device of Comparative Example 9 has a threshold voltage width as small as approximately 1 V/$\mu$m. Thus, the device does not have any analog tone property.

EXAMPLE 18

The general procedure of Example 17 was repeated except that an Au film was formed by sputtering instead of the Ag vertical deposition film, thereby obtaining a liquid crystal display device. The device was subjected to determination of the relation between the applied electric field intensity and the contrast ratio in the same manner as in Example 15, in which the bias voltage was ±2.5 V and the $V_{reset}$ pulse was ±25V. The results are shown in FIG. 34

COMPARATIVE EXAMPLE 10

The general procedure of Example 18 was repeated except that the Au vertical deposition film was not formed, thereby obtaining a liquid crystal display device. The relation between the applied electric field intensity and the contrast ratio was determined. The results are shown in FIG. 34.

Figure 34:
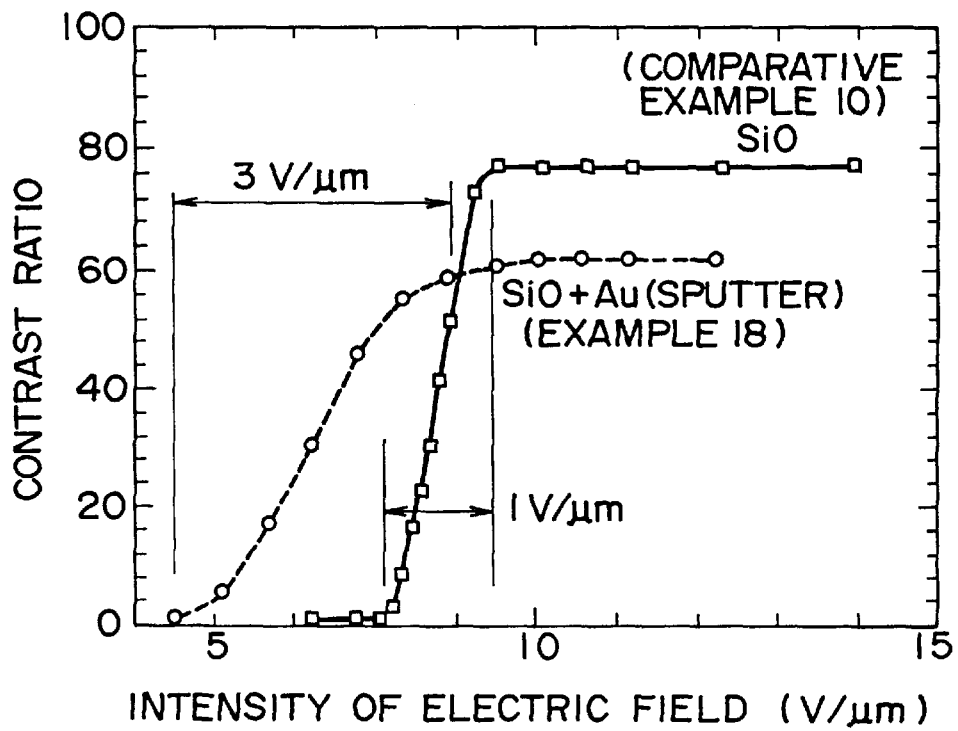
FIG. 34 is a graph showing the relation between the contrast ratio and the intensity of an applied electric field for different liquid crystal display devices of the invention and for comparison.

As will be apparent from FIG. 34, the device of Example 18 had a threshold value width as great as approximately 3 V/$\mu$m and the contrast was gently increased or decreased depending on the electric field intensity within a certain range. Accordingly, the device of Example 18 can display a analog tone.

In contrast, as shown from FIG. 34, the device of Comparative Example 10 has a threshold value width as small as about 1 V/$\mu$m and has thus little analog tone property.

COMPARATIVE EXAMPLE 11

An FLC display device was fabricated according to information disclosed in the afore-indicated Japanese Laid-open Patent Application No. 3-276126.

A polyimide JALS-246 of Japan Synthetic Rubber Co., Ltd. was spin coated in a thickness of 500 angstroms on an ITO transparent electrode-attached glass substrate with a length of 40 mm, a width of 25 mm and a thickness of 3 mm. The ITO had a surface resistance of 100 $\Omega/cm^2$ and was formed in a thickness of 500 angstroms. The spin coating was effected under conditions of 300 r.p.m. for three seconds and 3000 r.p.m. for 30 seconds. The polyimide-coated glass substrate was rubbed three times with a rubbing device having a rayon cloth fixedly wound about a roller under conditions of a hair-forced depth op 0.15 mm, a frequency of the roller of 94 r.p.m. and a stage feed speed of 5 cm/minutes.

Alumina particles with a size of 0.5 $\mu$m were sprayed over the substrate by use of a spacer spraying machine of Sonokom Co., Ltd., at a rate of 300 particles per $mm^2$. This is because the spraying of a greater number of the particles results in coagulation of the alumina particles. Spacers with a size of 2 $\mu$m were further sprayed using the same machine. In this case, the spraying density was 25 particles/$mm^2$.

Another glass substrate was provided and applied with a sealing agent of Structobond of Mitsui-Toatsu around a peripheral margin thereof. Both substrates were registered, after which a uniform pressure or force was applied to the substrates until a uniform gap of 1.7 $\mu$m was established. Two cells were made so that the directions of alignment were in parallel to and in anti-parallel to each, respectively. The pressure was 1 kg/cm². While bonding, the respective cells were placed in a hot air heater and allowed to stand at 180° C. for 2 hours to cure the sealing agent. Thereafter, the cell gap of the respective cells was measured using a cell gap measuring instrument of Ohtsuka Electronic Co., Ltd., revealing that the gap was controlled at 1.7 μm±0.1 μm throughout the cell.

A ferroelectric liquid crystal composition of ZLI-3775 of Merck Co., Ltd., was degassed at 80° C. in vacuum and heated to 110° C. within an isotropic temperature range, followed by injection into the respective cells in vacuum. For the injection, it took 1.5 hours. The cells were each allowed to cool down to room temperature. After cooling down to room temperature, the cell was sandwiched between crossed polarizing plates and subjected to observation of of the alignment of liquid crystal molecules through a microscope and also to measurement of electrooptic characteristics.

Figure 35A:
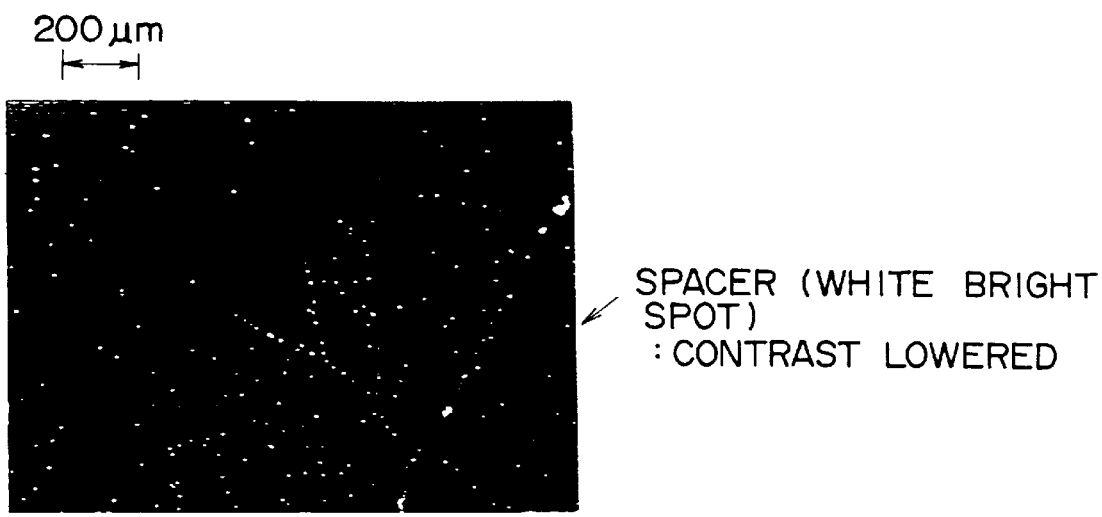
FIGS. 35A and 35B are, respectively, a schematic view illustrating a transmitting state of a liquid crystal display device for comparison.
Figure 35B:
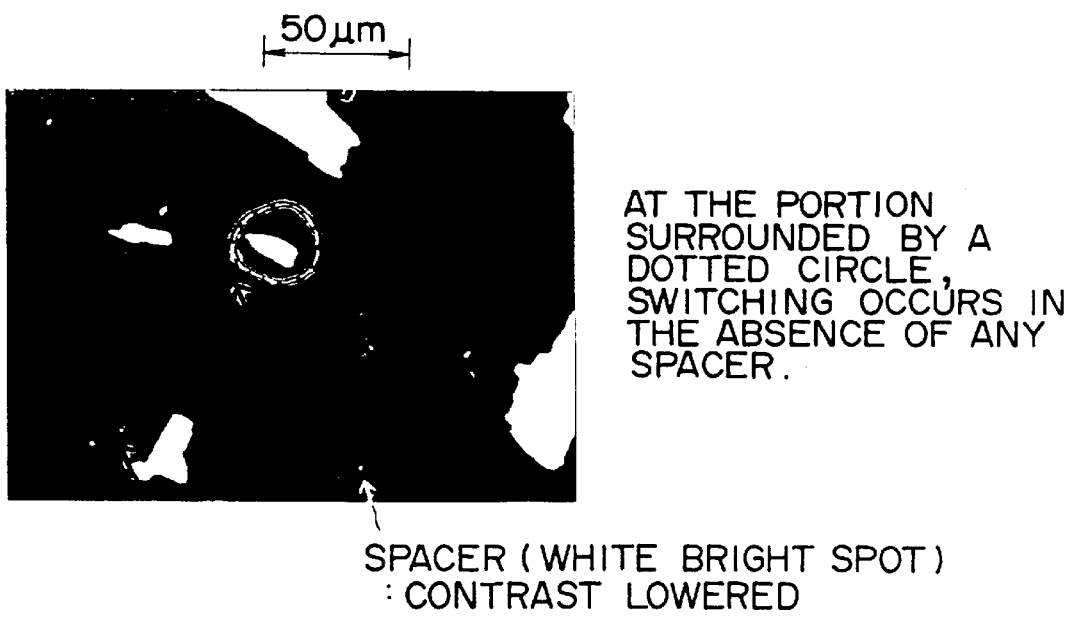

1) Alignment of Liquid Crystal Molecules:

As for the parallel aligning cell, as shown in FIG. 35, when the cell is turned black as a whole, light leakage takes place about the spacers. This is the main reason why the cell contrast is lowered, bringing about a lowering of a black level.

Since the ferroelectric liquid crystal is displayed in birefringence mode, the cell gap has to be controlled in a very strictly uniform, optimum thickness. However, at portions where alumina particles with a size of 0.5 μm have been dispersed, the particles serve as spacers. The gap created by the spacers is greatly deviated from an optimum cell gap, so that color shading is pronouncedly observed. Needless to say, this results in a considerable lowering of display quality. This is considered owing to the spacer whose size is great enough for the wavelength of visible light. An undesirable increase in spraying density of the spacers brings about light leakage about the spacers, resulting in an unfavorable lowering of contrast.

However, the starlight texture structure based on the present invention results from the dispersion of ultrafine particles, thus reducing the light leakage. In addition, the distribution of an effective electric field caused by the distribution of dielectric constant is effectively produced without disturbing the alignment of the liquid crystal.

As for the anti-parallel aligning cell, the aligning texture of the liquid crystal molecules is such that fine stripes in the order of μm were observed along the direction of the aligning treatment. When the cell was wholly kept in a black condition, light leakage about the spacers took place. This causes a lowering of the black level which is a main cause for lowering the contrast of the cell. A number of defects which are found about the spacers are considered to mainly cause the light leakage.

2) Electrooptic Effect

Parallel aligning cell: a reset pulse having a voltage of 30 V and a pulse width of 1 msecond was applied in a bipolar fashion, after which a signal pulse with a pulse width of 1 msecond was applied while changing a voltage of from 1 to 30 V, whereupon it was determined how the variation in transmittance differed from that of a bistable ferroelectric liquid crystal.

As a result, it was found that when the voltage was applied while changing, it was not observed microscopically that the liquid crystal molecules started to move from the upper portion of the spacers and it was found that the molecular alignment of the liquid crystal was disturbed at the upper portion of the spacers and was not uniform at all (i.e. in a wholly black condition, the upper portions were observed as a bright spot and in a wholly white condition, they were observed as a black spot, thus lowering the contrast in either case). In this connection, reference should be made to FIG. 35.

As for the inverted switching, it was observed that inversion took place, in some case, from the spacer portions and their neighbourhood, or started from other portions in some case. More particularly, the inverted switching does not always take place from the spacer portions and their neighbourhood.

It is important to note that when the inversion takes place, the domains are extended and that if the extension has the width of a threshold voltage, it should also have the width of a switching voltage. However, little extension in the width of the threshold voltage was observed as compared with prior art systems. The width of the threshold voltage was found to be 1 V. The change in switching domain was checked by changing the voltage in a DC mode, whereupon it was found that the domain was of a typical boat type. Moreover, since some zigzag defects were found at end portions of the cell, the cell structure was confirmed to be a chevron structure. The switching characteristic of the cell is such that the inversion may, in some case, take place at the spacer portions and their neighbourhood. Thus, the characteristic is like ordinary cells. Accordingly, the cell is not at all at a level of a tone display in one pixel.

Anti-parallel aligning cell: a reset pulse having a voltage of 30 V and a pulse width of 1 msecond was applied in a bipolar fashion, after which a signal pulse with a pulse width of 1 msecond was applied while changing a voltage of from 1 to 30 V, whereupon it was determined how the variation in transmittance differed from that of a bistable ferroelectric liquid crystal.

As a result, it was found that when the voltage was applied while changing, it was not observed microscopically that the liquid crystal molecules started to move from the upper portion of the spacers and it was confirmed that switching took place along fine stripes in the order of μm which appeared along the direction of the rubbing treatment. At the upper portion of the spacers, the molecule alignment of the liquid crystal is disturbed and is not uniform (see FIG. 35).

The spraying density of the spacers were then changed to check its influence. As a result, it was experimentally confirmed that with a cell wherein the spraying density was in the range of 0 to 500 particles/mm², the switching characteristic of the cell as a whole was just like the above case using a spraying density of 300 particles/mm².

The change in cell gap was also checked using a center value of 1.8 μm and 1.5 μm for the parallel alignment (in either case, the cell gap was controlled within ±0.1 μm). Similar device characteristics as set out above were obtained. With the anti-parallel alignment, the cells using cell gaps having center values of 1.5 μm and 1.8 μm, respectively, were checked with similar results being obtained.

From the above results, it will be seen that the display devices of the Japanese Laid-open Patent Application No. 3-276126 which were faithfully tested according to its examples did not produce such an effect as set forth in the Application with respect to the tone display. Thus, such devices are experimentally confirmed as not at a level of practical use.

The present invention is particularly described by way of examples and the embodiments of the invention may be further varied or modified within the scope of the invention.

For instance, various variations may be made to the types of liquid crystals, the types of materials, structures, and shapes for the respective members of the liquid crystal device, the manner of assembling the device, and physical properties and types of ultrafine particles used to form fine microdomains. In addition, the manner of addition of the ultrafine particles may be varied and such particles may be distributed not only in liquid crystals, but also on or in the alignment film. This is true of the other embodiments of forming the microdomains by buildup of a film such as of a charge transfer complex.

The starlight texture structure based on the present invention is characterized, as stated hereinbefore, in that two or more peaks of the X-ray diffraction spectra exist at an incident angle, α, of X-ray of not larger than 90 degree. The two or more peaks may exist at an incident angle of not smaller than 90 degree. In short, at least two peaks should exist at the incident angle, α, of either not larger than or not smaller than 90 degree. This essentially differs from known liquid crystal cells having such an angle of layer inclination that only one peak exists in the vicinity of the angle, α, of 90 degree or only peak exists at the angle, α, of not larger than or not smaller than 90 degree.

In the foregoing examples, liquid crystal devices which are suitable for use in display devices have been described since it is favorable to realize half tone especially with the display devices. The liquid crystal devices of the invention may be applicable not only to the display devices, but also to filters, shutters, display frame or screen of office automation apparatus, and phase control devices such as for wobbling. In all these devices, the transmittance or contrast ratio which depends on the drive voltage having such a threshold voltage width as set out hereinbefore can be utilized to attain performance as will not be achieved in prior art.

Once again, the liquid crystal device of the invention comprises a pair of substrates and a liquid crystal provided therebetween, characterized in that domains whose threshold voltages for switching the liquid crystal are finely distributed throughout the liquid crystal. Especially, microdomains whose threshold voltages ($V_{th}$) differ from one another exist in one pixel, so that the transmittance of the microdomains can be relatively gently changed depending on an applied voltage. Within one domain, if the liquid crystal molecules are bistable, a memory function is imparted. Thus, flicker-free still images can be formed. In addition, since one pixel consists of domains whose threshold voltages differ from one another and have a size in the order of $\mu$m, an analog continuous tone display is possible at high contrast. The gradation can be realized without resorting to a specific type of pixel and a specific manner of driving and such a liquid crystal device can be fabricated at low costs in a easy and reliable manner.

What is claimed is:

1. A display device comprising:

a substrate;

a liquid crystal material located above the substrate, said liquid crystal comprising fine particles and fine domains having threshold voltages which vary over a range of voltages;

an alignment film formed between the liquid crystal and the substrate; and a further film formed on the alignment film, said further film comprising ytterbium dipthalocyanine.

2. The display device of claim 1, further comprising a further film formed on the alignment film.

3. The display device of claim 1, wherein the fine particles are carbon black particles.

4. A method of manufacturing a display device comprising the steps of:

providing a substrate;

forming an electrode above the substrate;

forming an alignment film above the electrode;

placing a liquid crystal material above the alignment film;

forming a further film on the alignment film, said further film comprising ytterbium dipthalocyanine; and mixing fine particles in said liquid crystal for generating fine domains having threshold voltages which vary over a range of voltages.

5. The method of manufacturing a display device of claim 4, further comprising a step of forming an alignment film between the electrode and the liquid crystal.

6. The method of manufacturing a display device of claim 4, wherein the fine particles are carbon black particles.

* * * * *